(12) United States Patent
Mueller et al.

(10) Patent No.: US 12,147,779 B2
(45) Date of Patent: Nov. 19, 2024

(54) METHODS AND APPARATUS FOR ENRICHING ENTITIES WITH ALTERNATIVE TEXTS IN MULTIPLE LANGUAGES

(71) Applicant: TELEFONAKTIEBOLAGET LM ERICSSON (PUBL), Stockholm (SE)

(72) Inventors: Elisabeth Mueller, Mainz (DE); Anders Toverland, Lyckeby (SE); Ramanathan Oppilamani, Chennai (IN); Christoffer Gåhlin, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1002 days.

(21) Appl. No.: 17/049,805

(22) PCT Filed: May 4, 2018

(86) PCT No.: PCT/EP2018/061587
§ 371 (c)(1),
(2) Date: Oct. 22, 2020

(87) PCT Pub. No.: WO2019/210977
PCT Pub. Date: Nov. 7, 2019

(65) Prior Publication Data
US 2023/0161975 A1 May 25, 2023

(51) Int. Cl.
*G06F 40/58* (2020.01)
*G06F 40/205* (2020.01)
(Continued)

(52) U.S. Cl.
CPC ............ *G06F 40/58* (2020.01); *G06F 40/205* (2020.01); *G06F 40/47* (2020.01); *H04M 1/72436* (2021.01)

(58) Field of Classification Search
CPC .......... G06F 40/58; G06F 40/44; G06F 40/45; G06F 40/47
See application file for complete search history.

(56) References Cited

U.S. PATENT DOCUMENTS 6,826,593 B1 * 11/2004 Acharya ............. G06F 16/9574
709/217
8,312,110 B2 * 11/2012 Muraki ................. H04L 67/565
709/219
(Continued)

FOREIGN PATENT DOCUMENTS

EP 1847923 A1 10/2007

OTHER PUBLICATIONS

International Search Report/Written Opinion dated Jan. 25, 2019 in related/corresponding PCT Application No. PCT/EP2018/061587.

*Primary Examiner* — Lamont M Spooner
(74) *Attorney, Agent, or Firm* — Sage Patent Group

(57) ABSTRACT

Systems and methods are provided for translating text in a first language into text in a second language. The method includes: receiving a first message in the first language; parsing text from the first message into one or more portions, wherein each portion is identified by a unique identifier; translating each portion into a second language, wherein each translated portion is identified by the unique identifier; combining each translated portion into a logical format for use by a user; and returning the logical format in a second message in the second language for consumption by the user.

23 Claims, 19 Drawing Sheets

(51) Int. Cl.
*G06F 40/47* (2020.01)
*H04M 1/72436* (2021.01)

(56) References Cited

U.S. PATENT DOCUMENTS

| | | | |
|---|---|---|---|
| 10,740,069 B2 * | 8/2020 | Patino-Bueno | G06F 8/36 |
| 2002/0156688 A1 * | 10/2002 | Horn | G06Q 30/06 |
| | | | 705/28 |
| 2002/0174150 A1 * | 11/2002 | Dang | G06F 40/174 |
| | | | 715/201 |
| 2003/0110469 A1 * | 6/2003 | Jackson | G06F 9/454 |
| | | | 717/113 |
| 2004/0230416 A1 * | 11/2004 | Ye | G06F 40/47 |
| | | | 704/8 |
| 2004/0267803 A1 * | 12/2004 | Zhou | G06F 40/58 |
| | | | 707/999.102 |
| 2006/0156278 A1 * | 7/2006 | Reager | G06F 9/454 |
| | | | 717/104 |
| 2007/0233456 A1 * | 10/2007 | Kim | G06F 40/131 |
| | | | 704/2 |
| 2007/0294077 A1 | 12/2007 | Narayanan et al. | |
| 2008/0189096 A1 * | 8/2008 | Apte | G06F 8/61 |
| | | | 704/2 |
| 2011/0137636 A1 * | 6/2011 | Srihari | G06F 40/53 |
| | | | 704/2 |
| 2013/0067307 A1 | 3/2013 | Tian et al. | |
| 2013/0326347 A1 * | 12/2013 | Albright | G06F 9/454 |
| | | | 715/265 |
| 2014/0058719 A1 * | 2/2014 | Travieso | G06F 40/44 |
| | | | 704/2 |
| 2015/0039287 A1 * | 2/2015 | Han | G06F 40/58 |
| | | | 704/2 |
| 2015/0039295 A1 * | 2/2015 | Soschen | G06F 40/205 |
| | | | 704/9 |
| 2015/0134322 A1 * | 5/2015 | Cuthbert | G06F 40/58 |
| | | | 704/3 |
| 2015/0278190 A1 * | 10/2015 | Ohara | H04L 67/10 |
| | | | 704/10 |
| 2016/0162478 A1 * | 6/2016 | Blassin | G06Q 10/063112 |
| | | | 706/12 |
| 2016/0179481 A1 * | 6/2016 | Ohara | G06F 16/211 |
| | | | 717/109 |
| 2016/0350108 A1 * | 12/2016 | Joo | G06F 40/242 |
| 2017/0344582 A1 * | 11/2017 | Jurca | G06F 16/29 |
| 2018/0032491 A1 * | 2/2018 | Heo | G06Q 30/0277 |
| 2018/0068225 A1 * | 3/2018 | Miyoshi | G06N 5/022 |
| 2018/0143975 A1 * | 5/2018 | Casal | G06F 40/51 |
| 2018/0322177 A1 * | 11/2018 | Bhargava | G06F 16/256 |
| 2019/0065479 A1 * | 2/2019 | Wu | G10L 15/005 |
| 2019/0311038 A1 * | 10/2019 | Tu | G06F 40/237 |
| 2021/0124790 A1 * | 4/2021 | Travieso | G06F 16/958 |
| 2023/0161975 A1 * | 5/2023 | Mueller | G06F 40/47 |
| | | | 704/3 |

* cited by examiner

METHODS AND APPARATUS FOR ENRICHING ENTITIES WITH ALTERNATIVE TEXTS IN MULTIPLE LANGUAGES

TECHNICAL FIELD

The present invention generally relates to operations within communication networks and, more particularly, to mechanisms and techniques for providing support for multiple languages for applications which operate with business support systems (BSS).

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc.

Using these various services and applications (which for simplicity will both be called "applications" herein) can involve various forms of communication. For communication with human beings, text plays a very important role, even though most of the communication is supported by pictures, icons and other media. Communication using only pictures is typically not sufficient. Any type of presented media often provides texts in the language which can be understood by the target audience. Digital frontends often provide a mechanism to translate the control elements on the screen, e.g., menu items which are static, but most of the time these digital frontends lack the ability to translate and/or provide alternative texts for data content which can dynamically change over time. The phrase "alternative texts" describes both a typical language translation into one or more languages as well as the outputted text associated with using an artificial language. For example, using an artificial language of en-kids (children's English) the salutation of "Dear Sir" or "Dear Madame" could result in the alternative text of "hello friend". The same problem also applies to printed content. Additionally, even though the text template is available in different languages, the dynamically rendered content is not.

As there are many different types of applications provided via communication networks to end users that use a plurality of different languages, the current networked society in a global world could benefit from better multi-language support. Many frontend applications have some form of support for using, storing and delivering information and/or data. However, these applications lack support for showing the information and/or data in multiple languages.

Multiple language support can be divided into two areas, e.g., support of multiple language user interfaces (UIs) and support for translating data entities. Support of multiple language UIs is conventionally done by currently known technologies, e.g., resource bundles. Resource bundles are a Java™ mechanism used to isolate specific data which target UIs and messages for a single application. Resource bundles are a static design time approach which must be deployed to the application instances. These resource bundles can be extended only at the design time and thus, resource bundles are not a viable solution for translating data entities.

Support for translating data entities and alternative texts into multiple languages needs to be foreseen in the application at the time of its conception or design and requires a different approach as compared to resource bundles and UI translation. Today, applications typically use a variety of proprietary solutions for managing alternative texts in multiple languages, with these solutions being more or less static and requiring additional deployment to the application instances. Examples of these solutions include storing texts in separate database tables and linking them to the entities which own them, storing texts in files which are loaded or converted into resource bundles to be deployed to the application instance and storing texts in files which are then cached and refreshed when new texts are added.

All of the known, existing solutions target the translations of texts belonging to a single application. Currently there is no central repository to provide alternative texts in multiple languages for entities used in a system, be it any type of entity, e.g., data, screen or system, that carries information that is to be consumed by an audience, apparatus and/or other consumer of information. Further, there is no centralized solution available which allows supporting and externalizing translations which are performed across multiple applications. In addition, adding new translations for legacy systems outside of an organization's control is very difficult without expending a significant coding effort in order to take care of storing and managing new texts in one or more alternative languages, adapting the translation process to account for the new translations, and to add the needed retrieval and display logic. Indeed in many cases adding new translations and alternative texts to various data entities associated with an application can require a full data migration effort.

Thus, there is a need to provide methods and systems that overcome the above-described drawbacks associated with respect to multiple language translations of text associated with applications and the like.

SUMMARY

Embodiments described herein provides systems and methods which allow adding centralized support for texts in multiple languages to applications without the need for a full data migration. Various mechanisms provide a common approach to configure "plain" translation for texts in different languages and dialects as well as alternative texts for different contexts, e.g., channels and specific target audiences. Additionally, using a common and centralized mechanism can add multi-language support for content which does not currently have this support.

According to an embodiment, there is a method for translating text in a first language into text in a second language, the method including: receiving a first message in the first language; parsing text from the first message into one or more portions, wherein each portion is identified by a unique identifier; translating each portion into a second language, wherein each translated portion is identified by the unique identifier; combining each translated portion into a logical format for use by a user; and returning the logical format in a second message in the second language for consumption by the user.

According to an embodiment, there is a communication node for a translating text in a first language into text in a second language, the communication node including: communication interface configured to receive a first message in the first language; a processor configured to parse text from the first message into one or more portions, wherein each portion is identified by a unique identifier; the processor being further configured to translate each portion into a second language, wherein each translated portion is identified by the unique identifier; the processor being further configured to combine each translated portion into a logical format for use by a user; and the communication interface being further configured to return the logical format in a second message in the second language for consumption by the user.

According to an embodiment, there is a computer-readable storage medium containing a computer-readable code that when read by a processor causes the processor to perform a method for translating text in a first language into text in a second language, the method including: receiving a first message in the first language; parsing text from the first message into one or more portions, wherein each portion is identified by a unique identifier; translating each portion into a second language, wherein each translated portion is identified by the unique identifier; combining each translated portion into a logical format for use by a user; and returning the logical format in a second message in the second language for consumption by the user.

According to an embodiment, there is an apparatus adapted to receive a first message in the first language, parsing text from the first message into one or more portions, wherein each portion is identified by a unique identifier; translating each portion into a second language, wherein each translated portion is identified by the unique identifier; combining each translated portion into a logical format for use by a user; and returning the logical format in a second message in the second language for consumption by the user.

According to an embodiment, there is an apparatus including: a first module configured to receive a first message in the first language, a second module configured to parse text from the first message into one or more portions, wherein each portion is identified by a unique identifier; a third module configured to translate each portion into a second language, wherein each translated portion is identified by the unique identifier; a fourth module configured to combine each translated portion into a logical format for use by a user; and a fifth module configured to return the logical format in a second message in the second language for consumption by the user.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
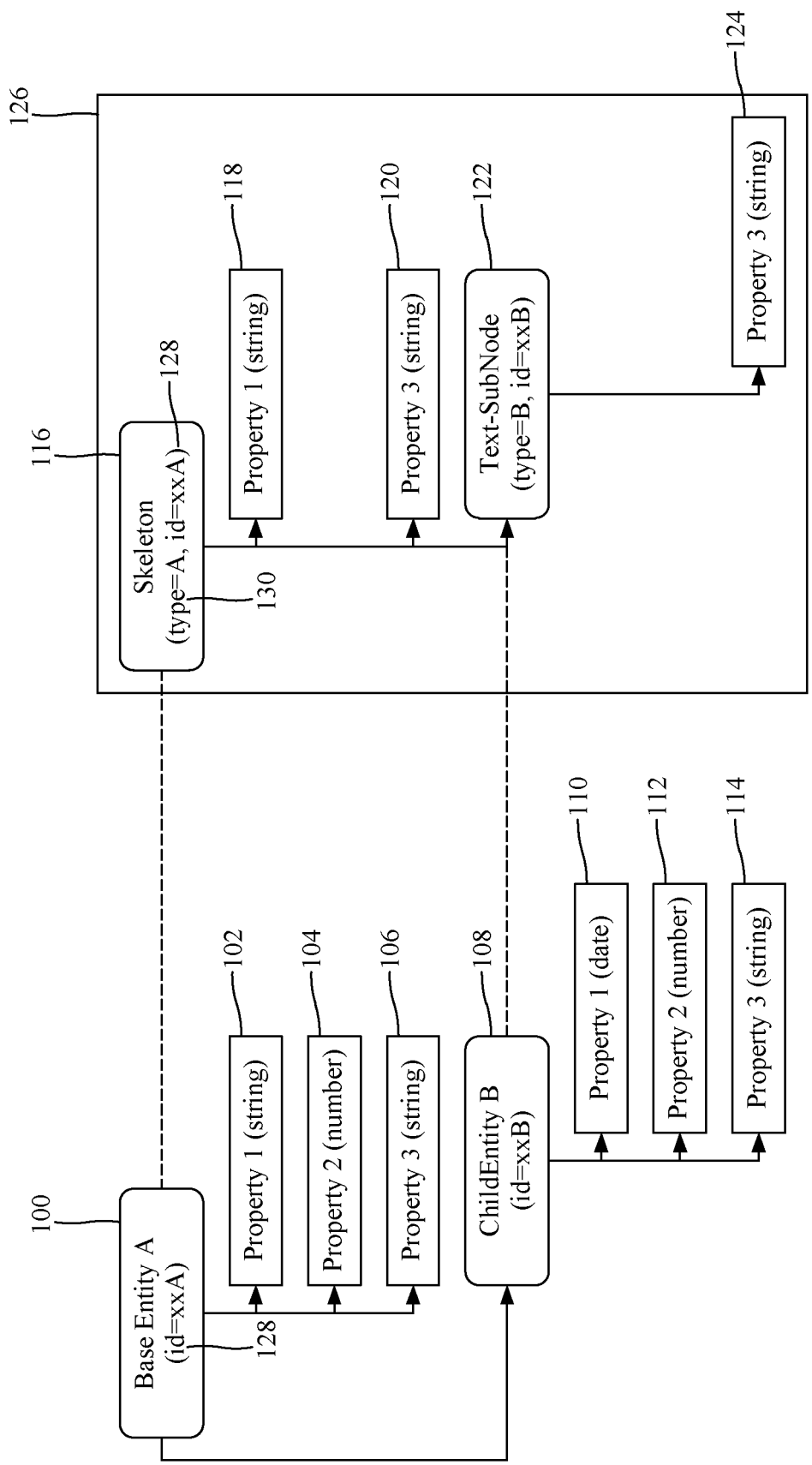
FIG. 1 shows a relationship between a base entity and a text entity according to an embodiment.

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with current methods for performing multiple language translations of text associated with applications and other products/services which interact with users and devices. "Applications", as described herein, include applications, services and other products, typically obtainable through a communication or operator network, for which multiple language translations could be useful.

Embodiments described herein provide systems and methods which enable centralized support for texts in multiple languages to applications without the need to perform a full data migration. These systems and methods address alternative texts to be captured for data entities managed by the applications with a focus on configuration and efficient retrieval of the alternative texts at runtime. Alternative texts can be configured for different languages, e.g., English, German, Swedish and Chinese, different dialects of these languages, artificial languages, as well as different contexts, e.g., frontend channels and/or the intended audience. Examples of artificial languages include, but are not limited to, en-Kids (kids English and salutations), en-Teens (teenager's English), de-Kinder (children's German) and ru-ASCII7 (for displaying Russian strings on certain phones which do not display Cyrillic characters). Other embodiments enable serving both applications which have foreseen a need for alternative texts and/or translations as well as applications which do not express a potential need (even if one day the applications may have this need) for managing translations or alternative texts in other languages. One example of an application according to these embodiments which illustrates centrally managing translation or alternative texts in other languages is an application in which strings of text to be translated are decoupled from the object.

Prior to describing these and other embodiments in more detail, an overview of a process for performing the translations of the alternative texts is described. According to an embodiment, a text entity can be created as an entity skeleton which is aligned to the structure of a base entity for which the text entity carries the texts. The entity skeleton can be created as a hierarchical structure which identifies each structural node by entity type and entity identification (ID). Further, each structural node can include information describing the language or dialect in which the string was entered, translatable properties and a translated value. Each translatable property can be identified by a concatenation of node keys and property name as well as an optional unique string reference ID.

According to an embodiment, a serialization mechanism for translations and alternative texts belonging to the same object hierarchy is provided. This serialization mechanism creates a representation of the entity skeleton populated with texts for translatable properties. The serialization result is a blob, which is a flattened string, which can cope with any base object hierarchy. An example using pseudo code associated with a Location is shown below for illustration.

```
{
    "id": "554321",
    "entityType": "Location",
    "language": "en",
    "creationDate": "2018-03-03T10:20:43.206+01:00",
        "lastModifiedDate": "2018-03-03T11:20:43.207+01:00"
    },
    {
        "translatableFieldName": "description",
        "translatableValue": "Karlskrona City",
        "translationId": "12366",
        "creationDate": "2018-03-03T10:20:43.206+01:00",
        "lastModifiedDate": "2018-03-03T11:20:43.207+01:00"
    }
],
"childEntities ": [
    {
        "id": "223",
        "entityType": "Characteristic",
        "language": "en",
        "creationDate": "2018-03-03T10:20:43.206+01:00",
        "lastModifiedDate": "2018-03-03T11:20:43.207+01:00",
        "childEntities": [ ],
        "translatableFields": [
            {
                "translatableFieldName": "name",
                "translatableValue": "Region",
                "translationId": "12375",
                "creationDate": "2018-03-03T10:20:43.206+01:00",
                "lastModifiedDate": "2018-03-03T11:20:43.207+01:00"
```

-continued

```
            }
        ],
        "managedBy": [ ]
    }
],
```

The text entries include a language, a normalized root entity key and the serialization result.

Embodiments can interact with both structured query language (SQL) and non-SQL databases. For example, given an SQL database, the serialization mechanism can be executed prior to persisting the translation and given a non-SQL database, the serialization mechanism can be a part of the conversion to the blob which is representing the translations. The operation of creating translations can be supported by direct write operations to the text entities or, for example, by a file-based import/export mechanism using a common file format. Additionally, at runtime, the translated texts can be addressed and retrieved by using the concatenated key, navigating the entity hierarchy or by a unique string reference ID.

The foregoing provides a general overview of translation systems according to embodiments described herein. The following text describes the embodiments in greater detail and can be considered as having four parts: (1) a first section associated with describing the different data structures and entities illustrated in FIGS. 1-6 which can be used in translation systems and methods according to embodiments, (2) a second section associated with describing various processes illustrated in FIGS. 7-12 which can be used in translation systems and methods according to embodiments, (3) a third section describing FIGS. 13-16 and which provides a detailed working example of the data in the first and second sections and (4) some general implementation details associated with FIGS. 17-19.

Starting then with the data entities used in embodiments, FIG. 1 shows the relationship between a base entity 100 and a text entity 126 according to an embodiment. The base entity 100 has three properties 102, 104 and 106 as well as a child entity 108 which also has three properties 110, 112 and 114. In this example, the text entity 126 includes an entity skeleton 116 which is aligned to base entity 100. This alignment can be seen by their same IDs 128, as well as by their same relative position in the hierarchy. Entity skeleton 116 also includes an entity type 130 as well as two properties 118 and 120 and a text sub node 122. It is to be noted that text entity 126 has fewer items in it than the base entity 100 as only the properties with text strings 102, 106, 114 are desirable for translation and not the properties with numbers 102, 112 or dates 110. This can be seen in the text entity which includes only the three properties 118, 120 and 124 which have text strings. Additionally, more or fewer properties and sub nodes can be used as needed to support the translation process.

Figure 2:
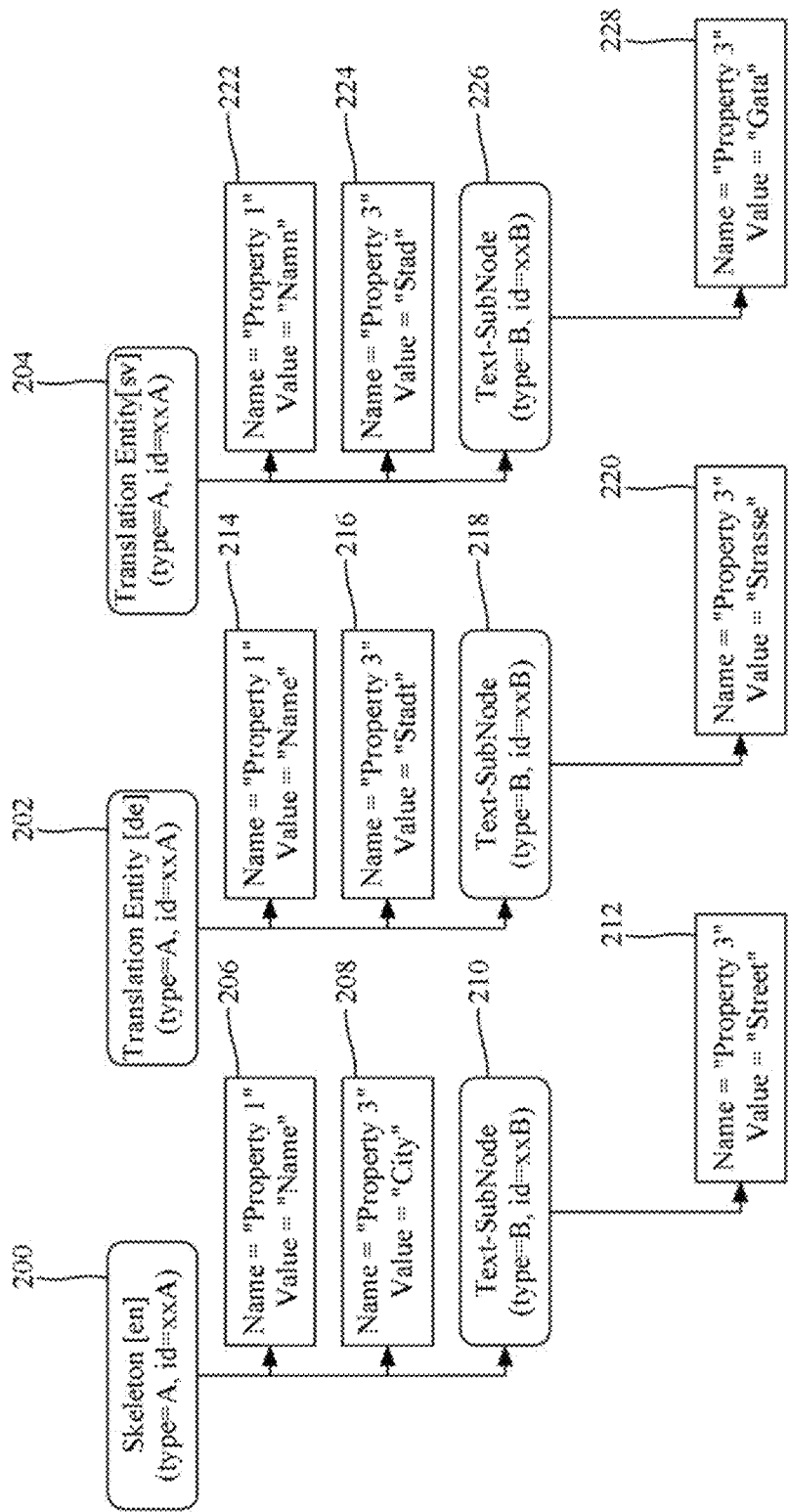
FIG. 2 depicts a relationship between an entity skeleton and two translation entities according to an embodiment.

FIG. 2 shows the relation between the entity skeleton [en] 200 and the two translation entities [de] 202 and [sv] 204. Entity skeleton [en] 200 includes three properties 206, 208 and 212 each of which includes a value and a name in English, as well as a text sub node 210. Translation entity [de] 202 and translation entity [sv] 204 have the same structure as entity skeleton [en] 200 with the difference being in the translated content. Thus, translation entity [de] 202 has properties 214, 216 and 220 and a text sub node 218 and translation entity [sv] 204 has properties 222, 224 and 228 and a text sub node 226. Text subnodes contain text and correspond to child entities of the parent entity. Text subnodes are located below the parent node in the hierarchy. To understand the differences in the entities, consider the comparison of the row which includes properties 208, 216 and 224. In this row, property 208 has a Value="City", property 216 has the Value="Stadt" and property 224 has the Value="Stad" showing the differently translated Values. Note that a detailed example of an actual translation from English into Swedish and German using these entities is provided below with respect to FIGS. 13 and 14.

Figure 3:
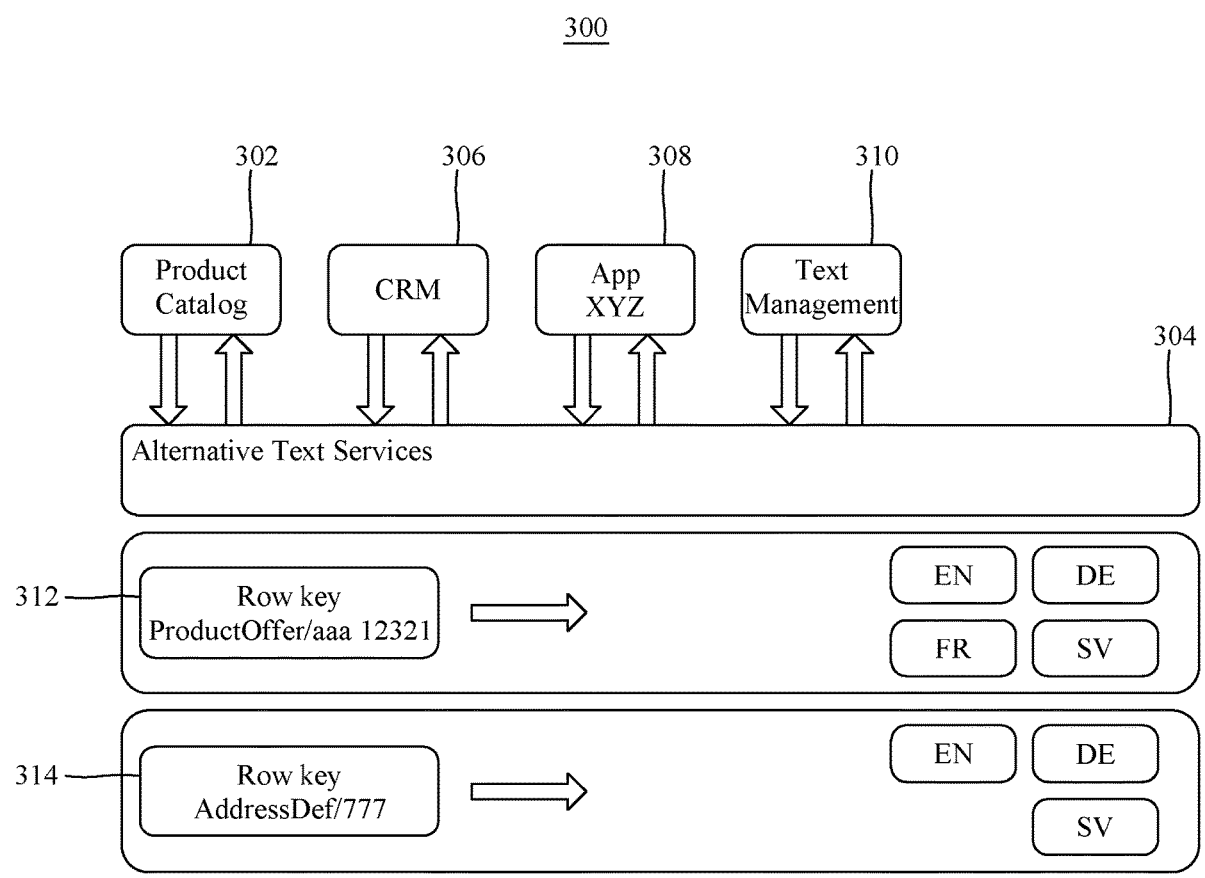
FIG. 3 illustrates a deployment view using non-structured query language (SQL) database according to an embodiment.

FIG. 3 illustrates a deployment view of a non-SQL database 300 which provides translation (alternative text) services to a Product Catalog application 302 and another application (App XYZ) 308. In FIG. 3 the application Product Catalog 302 is considered to be the application owning product entities. With the help of the alternative text services 304, the product catalog 302 creates a skeleton entry for e.g. a product offering (aaa1232i) 312. the application CRM 306 is considered to be the application owning the addressDef entity 777. With the help of the alternative text services 304, the CRM application 306 creates a skeleton entry for, e.g., the addressDef (777) 314. The text management application 308 is responsible to create and manage the alternative texts in languages De, Fr and Sv. For this purpose, the text management application 308 used the alternative text services 304. CRM 306, Product Catalog 308 and Application XYZ 310 can then use the alternative text services to display and show texts of entities not only in the system language en, but also in other languages like De or Sv.

Figure 4:
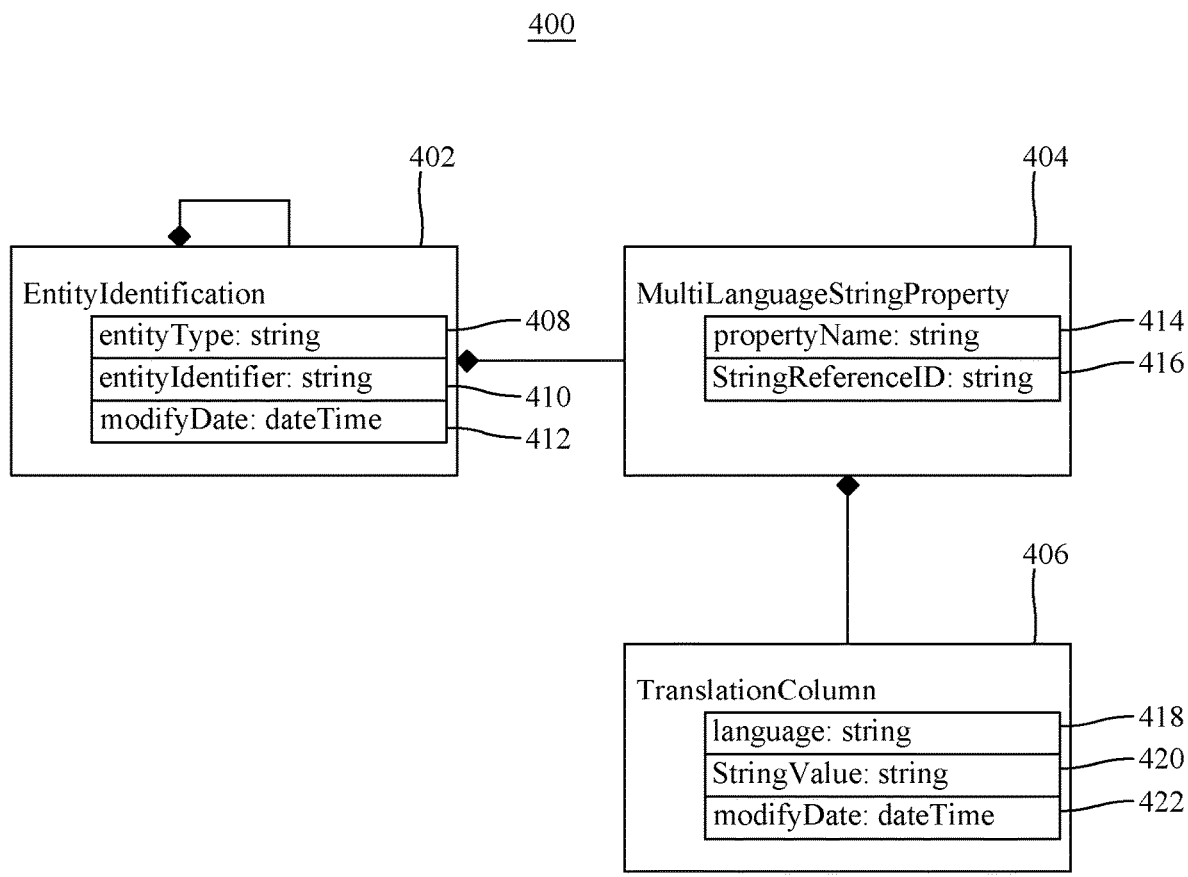
FIG. 4 depicts a logical structure for managing alternative texts according to an embodiment.

According to an embodiment, alternative texts can be stored in a compressed blob-format combining structured addressing with an ID-based addressing mechanism. An example of a logical structure 400 for managing alternative texts can be depicted as shown in FIG. 4. The logical structure 400 includes the following three structural blocks: EntityIdentification 402; MultiLanguageStringProperty 404; and TranslationColumn 406. EnitityIdentification 402 includes the fields of entityType 408 which is a string, entityIdentifier 410 which is a text string, and modifyDate 412 which identifies a date and time. MultiLanguageStringProperty 404 includes the fields of propertyName 414 which is a text string and StringReferenceID 416 which is a text string. TranslationColumn 406 includes the fields of language 418 which is a text string, StringValue 420 which is a text string and modifyDate 422 which identifies a date and time.

This logical structure can support any type of composite entity structures. Reusing StringReferenceID 416 is possible. For example, StringReferenceID 416 can be used as a signal to the translation solution that the translated values should be shared. The EntityIdentification 402 needs to be unique with respect to context only, in other words, the root entityIdentifier 410 needs to be unique within the entityType 408 and the identifiers of entities on composite levels have to be unique with respect to the context of the entity type and the owning entity. In other words, when one refers to the node of a hierarchical structure, then the ID of the next subnode needs to be unique in the context of its parent node.

StringReferenceIDs 416 (also referred to herein as reference ID strings) are a type of data string and should be unique among all client applications that use the centralized translation service. Uniqueness can be achieved by, for example, using universally unique identifiers (UUIDs). If name based UUIDs are used, these will typically not be just random, but also re-creatable. Alternatively, according to another embodiment, reference ID strings can be constructed as a concatenation of a name space defined by the client application combined with some form of application proprietary logic for uniqueness, e.g., using a database sequence.

Figure 5:
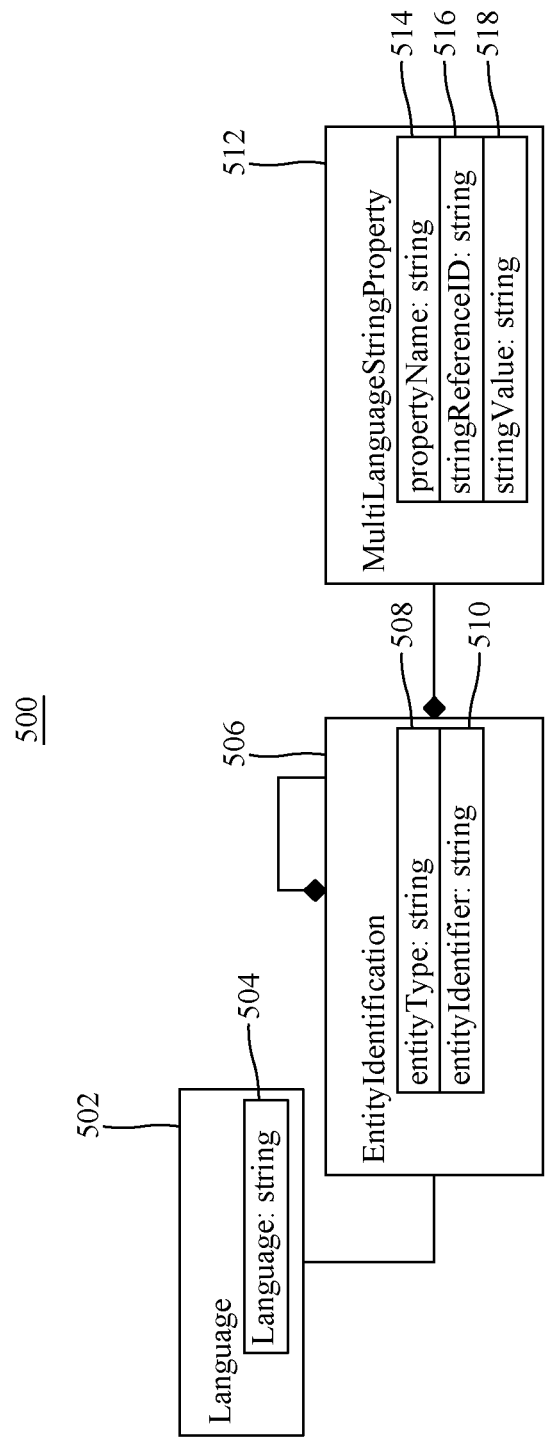
FIG. 5 shows another logical structure according to an embodiment.
Figure 6:
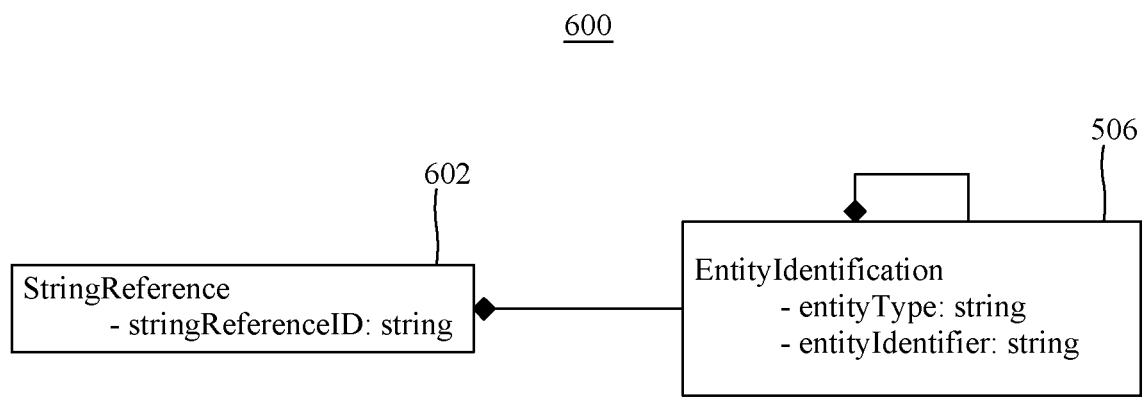
FIG. 6 shows a logical structure including a back-reference according to an embodiment.
Figure 7:
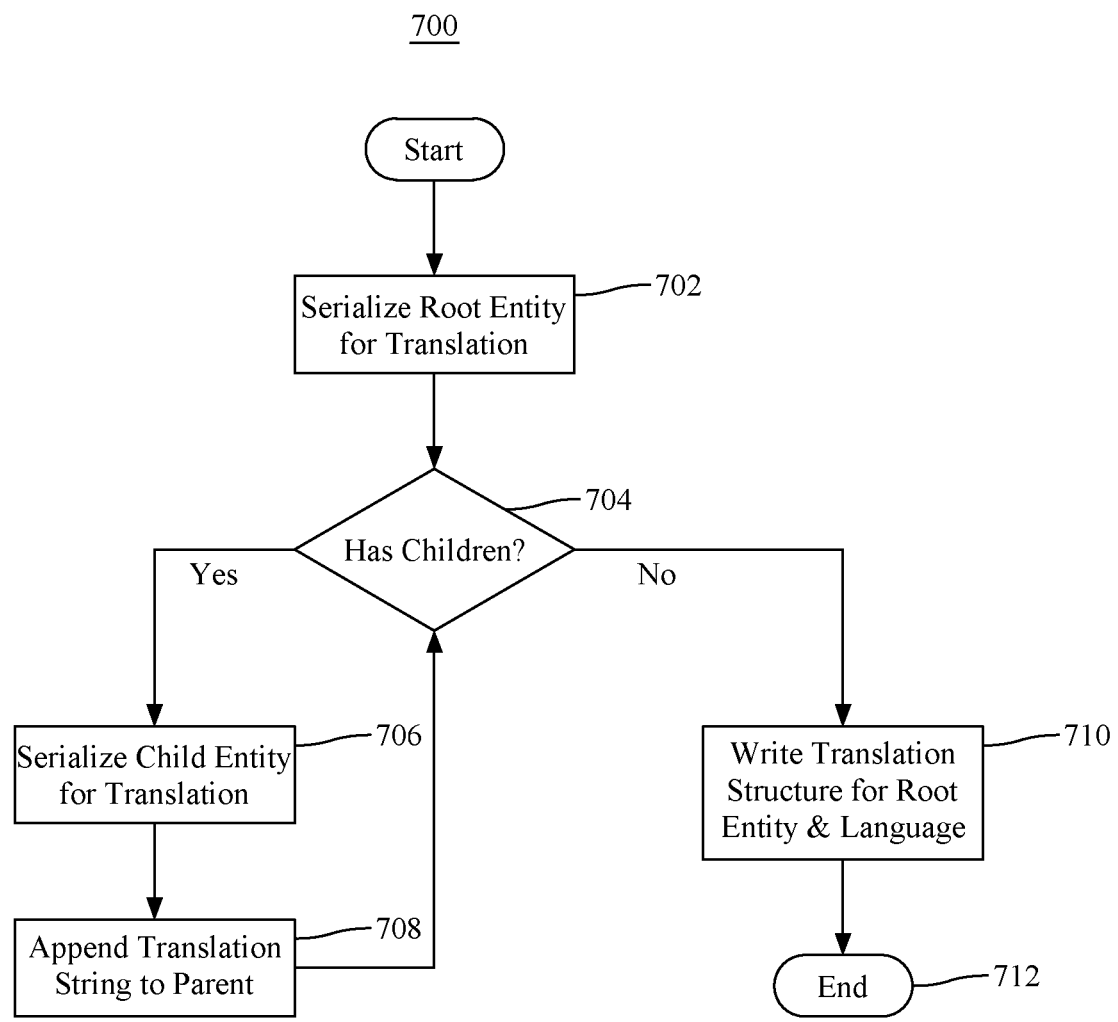
FIG. 7 shows a flowchart illustrating serialization of an object hierarchy according to an embodiment.

According to another embodiment, in some scenarios for performance optimization or to avoid concurrency, the logical structure of FIG. 4 can also be slightly restructured to manage text object hierarchies for each language separately. This modified logical structure 500 is represented in FIG. 5 and includes three structural blocks. Language 502 block which includes Language 504 field which is a text string. EntityIdentification 506 block includes entityType 508 and entityIdentifier 510 fields, both of which are text strings. MultiLanguageStringProperty 512 block which includes propertyName 514, stringReferenceID 516 and stringValue 518 fields, all of which are text strings. While sharing similar structures/fields to logical structure 400, logical structure 500 has moved Language 502 to its own separate block as compared to its location within the TranslationColumn 406 as shown in FIG. 4.

According to another embodiment, while the persistence solution can be optimized for reading by root-type and root-id, a back-reference can also be implemented to provide a lookup from StringReferenceID 602 as shown in logical structure 600. It is to be understood that the logical structures 400, 500 and 600 can be further modified and combined as desired in supporting the various embodiments associated with multi-language translations as described herein.

According to an embodiment, there is a mechanism that uses the entities and logical structures described above with respect to FIG. 1-6 to configure alternative texts. Initially, an application using the alternative text service creates an initial entry in the translation table containing the strings desired to be translated, preferably in the system default language. Each client application has its own data structure with different needs for alternative texts, i.e., which strings of which objects need texts in other languages. These needs depend on the application and the information which is meant to be exposed to a human being, or in certain cases, to a machine. Due to the generic manner of addressing strings, many, if not most or all, types of client applications can be supported by the various embodiments described herein. As a consequence, any object structure including any entity type or hierarchal structure can be supported, as long as objects can be uniquely addressed within their context.

Entries in other languages can be added by import/export mechanisms or by dedicated UIs. These UIs or file-based translation procedures can be centralized as well, since they operate on a centralized repository of text objects across all applications using the alternative text services. Entries for alternative text anchors can be created by batch when applying the add-on functionality for alternative texts.

According to an embodiment, a serialization algorithm is applied to create a translation entry for a hierarchical structure. This translation entry includes a key and a binary data blob. The key is made from the triplet of Root Entity Type, which is a string, rootEntityID, which is a unique string within the same root entity type, and the language. The root entity type can be any kind of string identifying the data object, e.g., address, product, etc. As used herein, the root entity is a base entity on the top level of the hierarchy and base entities, in general, are objects where the initial skeleton is built from. The rootEntityID is an ID which is unique per entity-type. The language is a language identifier compliant to a locale or the base language of a locale. The triplet of Root Entity Type, rootEntityID and language, is a key which is unique in the scope of the alternative text solution. The data blob is a serialization of a hierarchical structure made up of entity keys (type and ID) as well as arrays of translatable string property, string value and string reference triplets. A back-reference object is created for each translation entry, which supports a second access path via the string reference ID.

Having described the general data structures and entities which can be used by the embodiments, the discussion now turns to various processes which use these data entities and structures to perform translations. According to an embodiment, a flowchart 700 illustrating serialization of an object hierarchy is now described with respect to FIG. 7. Initially, to serialize an object hierarchy, the process serializes the Root Entity for translation as shown in step 702. A determination is made in step 704 as to the presence of associated children for the Root Entity. If yes, the Child Entity is serialized for translation as shown in step 706. Steps 702 and 706 describing serializing for translation, with the actual translation being performed as described below with respect to FIG. 8. Appending the Translation String to the parent then occurs in step 708. The step of determination 704 is repeated until no more Child Entities are found. Once a no result occurs in step 704, a write TranslationStructure for RootEntity and Language operation occurs as shown in step 710, this includes writing down a row containing a key/value pair with the key being RootEntityType/RootEntityID/language and the value being the serialized string. The process for serializing an object hierarchy is then terminated as shown in step 712. The steps shown in flowchart 700 can be repeated for a plurality of Root Entities.

Figure 8:
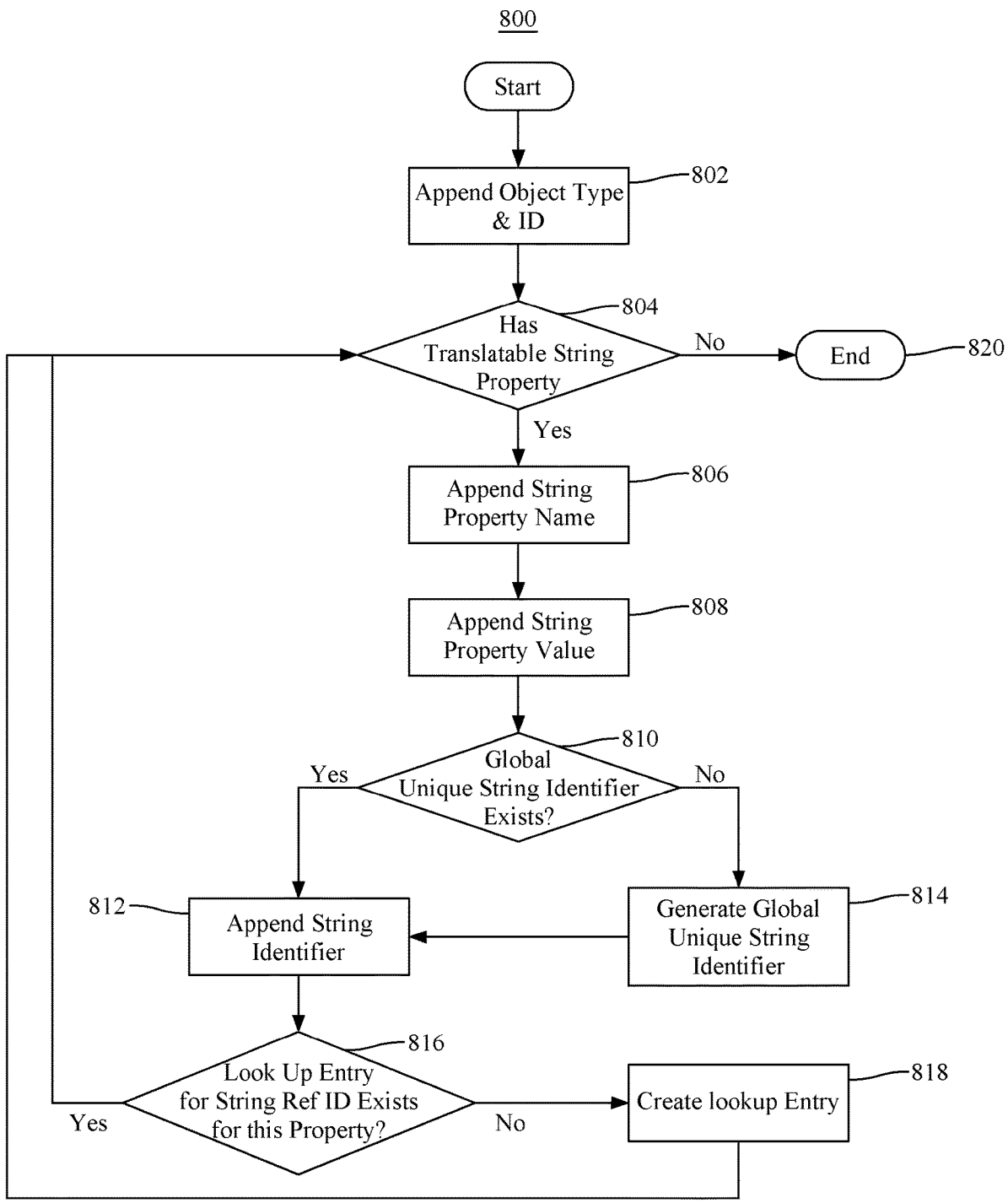
FIG. 8 depicts a flowchart illustrating serialization of translatable string properties of an object according to an embodiment.

According to an embodiment, a flowchart 800 illustrating serialization of translatable string properties of an object is now described with respect to FIG. 8. Initially, in step 802, an object type and ID are appended as two properties. For example, "id" as 554321 and "entityType" as Location. Next, in step 804, it is determined if the appended object type and ID have a translatable string property. If yes, then a string propertyName is appended in step 806 and a string propertyValue is appended in step 808 to the property. In step 810, it is determined if a global unique string identifier exists for the current property. If the determination results in a no, then the centralized system generates a global unique string identifier as shown in step 814. In step 812, which occurs either after a yes determination from step 810 or from the generation of the global unique string identifier from step 814, the global unique string identifier is appended to the current property.

In step 816, it is determined if a lookup entry for the String RefID exists for the current property. if the answer is no, a lookup entry is created for the current property in step 818. Once it is determined if there is a lookup entry or if a lookup entry is created for the current property, the process returns to step 804 to determine if there is another translatable string property for the current process. If yes, the above described flow as shown in FIG. 8 iterates until a no determination is made with respect to step 804. After a no determination is made, the process ends as shown in step 820.

Using the serialization "engine" from the text services and creating a string containing a json structure of all nodes & there string properties below a root entity is shown below using the serialization as described in FIG. 8.

```
{
  "id": "554321",
  "entityType": "Location",
  "language": "en",
  "creationDate": "2018-03-03T10:20:43.206+01:00",
  "lastModifiedDate": "2018-03-03T11:20:43.207+01:00",
  "translatableFields": [
    {
      "translatableFieldName": "name",
      "translatableValue": "Karlskrona",
      "translationId": "12345",
      "creationDate": "2018-03-03T10:20:43.206+01:00",
      "lastModifiedDate": "2018-03-03T11:20:43.207+01:00"
    },
    {
      "translatableFieldName": "description",
      "translatableValue": "Karlskrona City",
      "translationId": "12366",
      "creationDate": "2018-03-03T10:20:43.206+01:00",
      "lastModifiedDate": "2018-03-03T11:20:43.207+01:00"
    }
  ],
  "childEntities": [
    {
      "id": "223",
      "entityType": "Characteristic",
      "language": "en",
      "creationDate": "2018-03-03T10:20:43.206+01:00",
      "lastModifiedDate": "2018-03-03T11:20:43.207+01:00",
      "childEntities": [ ],
      "translatableFields": [
        {
          "translatableFieldName": "name",
          "translatableValue": "Region",
          "translationId": "12375",
          "creationDate": "2018-03-03T10:20:43.206+01:00",
          "lastModifiedDate": "2018-03-03T11:20:43.207+01:00"
        }
      ],
      "managedBy": [ ]
    }
  ]
}
```

According to an embodiment, the ability to create entries for alternative texts by addressing them via structured keys can be the prerequisite for an adjunct solution. The ability to manage string references in parallel as a second addressing mechanism allows to combine solutions, which support decoupling of translatable strings from the entities they manage, with other applications which do not currently have support for translatable strings in the system.

According to an embodiment, access to the alternative texts in the request language can be provided by accessing all of the strings of an object or list of objects for a target language by structured addressing and/or by accessing a list of strings for a target language by absolute addressing. An application which wants to provide alternative texts for its own data objects can request the alternative texts for a list of target languages using the APIs provided by the multi-language component.

Text can be accessed by using the structured key. For example, for retrieving an alternative string for an entity property in a requested language, the serialized translation blob is retrieved by using the structured key consisting of root entity type, root entity ID and language. The alternative texts contained in the translation blob are then either returned as a whole or only for a dedicated sub-entity respectively for a single string. Embodiments can also allow for optimizing performance when all alternative texts belonging to an entity or sub-entity are returned together, since this allows for efficient merging on the client side.

Figure 9:
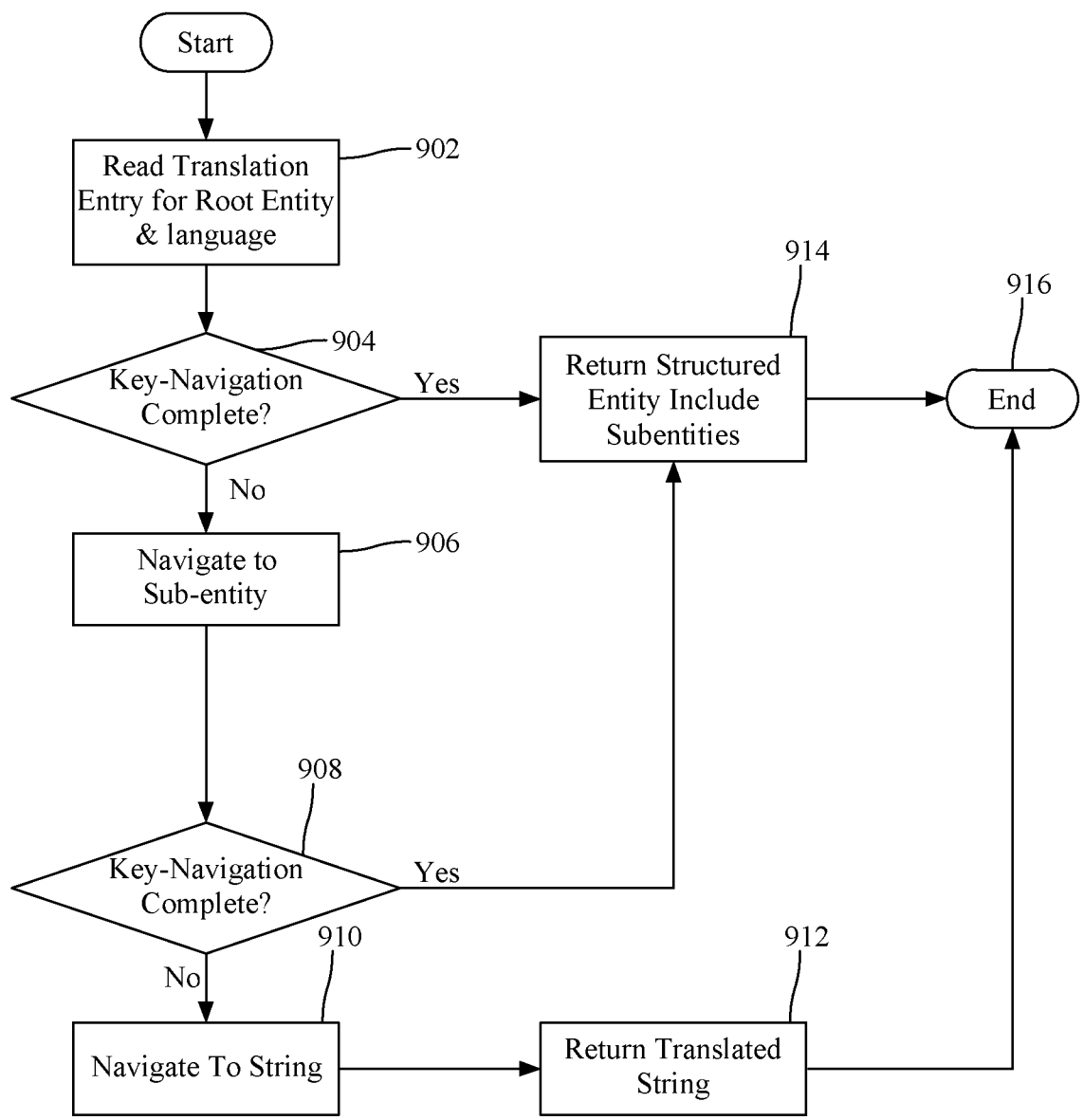
FIG. 9 shows a flowchart illustrating a process for obtaining translated strings according to an embodiment.

According to an embodiment, a process for obtaining translated strings using a structured key is now described with respect to the flowchart 900 shown in FIG. 9. Initially, in step 902, an operation read TranslationEntry for RootEntity and language occurs. The structured access key given as input refers either to the root entity, a sub-entity or to a dedicated string column of an entity. In step 904, described as key navigation complete, a decision is made as to whether or not the whole object and its sub-entities are being returned or a further navigation to a sub-entity is executed. This decision is made based on the structured access key given as input. If the determination is no, for the scenario when the structured key points to a further sub-entity, then in step 906, navigation to a sub-entity occurs followed by another determination as to whether or not the whole object is to be returned to the client as shown in step 908. When the key navigation complete shown in either step 904 or 908 is determined to be complete, the process moves on to step 914 in which the structured entity including sub-entities, which is based on the object, is returned to the client followed by ending the process as shown in step 916.

However, if the determination is made at step 908 to not return the whole object to the client, the process moves along to step 910 which navigates to a string associated with the structured key. In step 912 the translated string is returned to the client followed by ending the process as shown in step 916.

Figure 10:
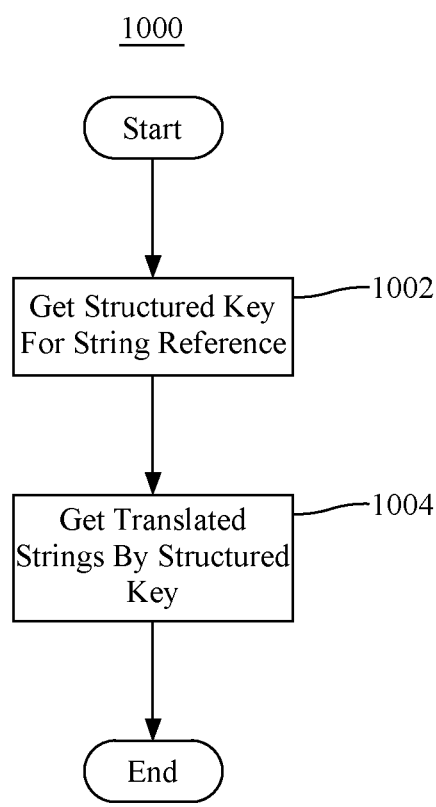
FIG. 10 depicts a flowchart of a mechanism for accessing text according to an embodiment.

According to an embodiment, there also is a mechanism to access text by using the StringReference ID as shown in flowchart 1000 with respect to FIG. 10. Retrieving the translated string by language and string reference ID is shown as a two-step process. In step 1002, which shows get structuredKey for StringReference, the string reference ID is mapped to the structured key. In step 1004, the structured translation entry is accessed for the requested language.

According to an embodiment, access to alternative texts can be extended to support a fallback mechanism. Additionally, in case a translation entry for a requested language is missing, the alternative text services will implement a fallback logic to check for the availability of an alternative text in the base language.

Figure 11:
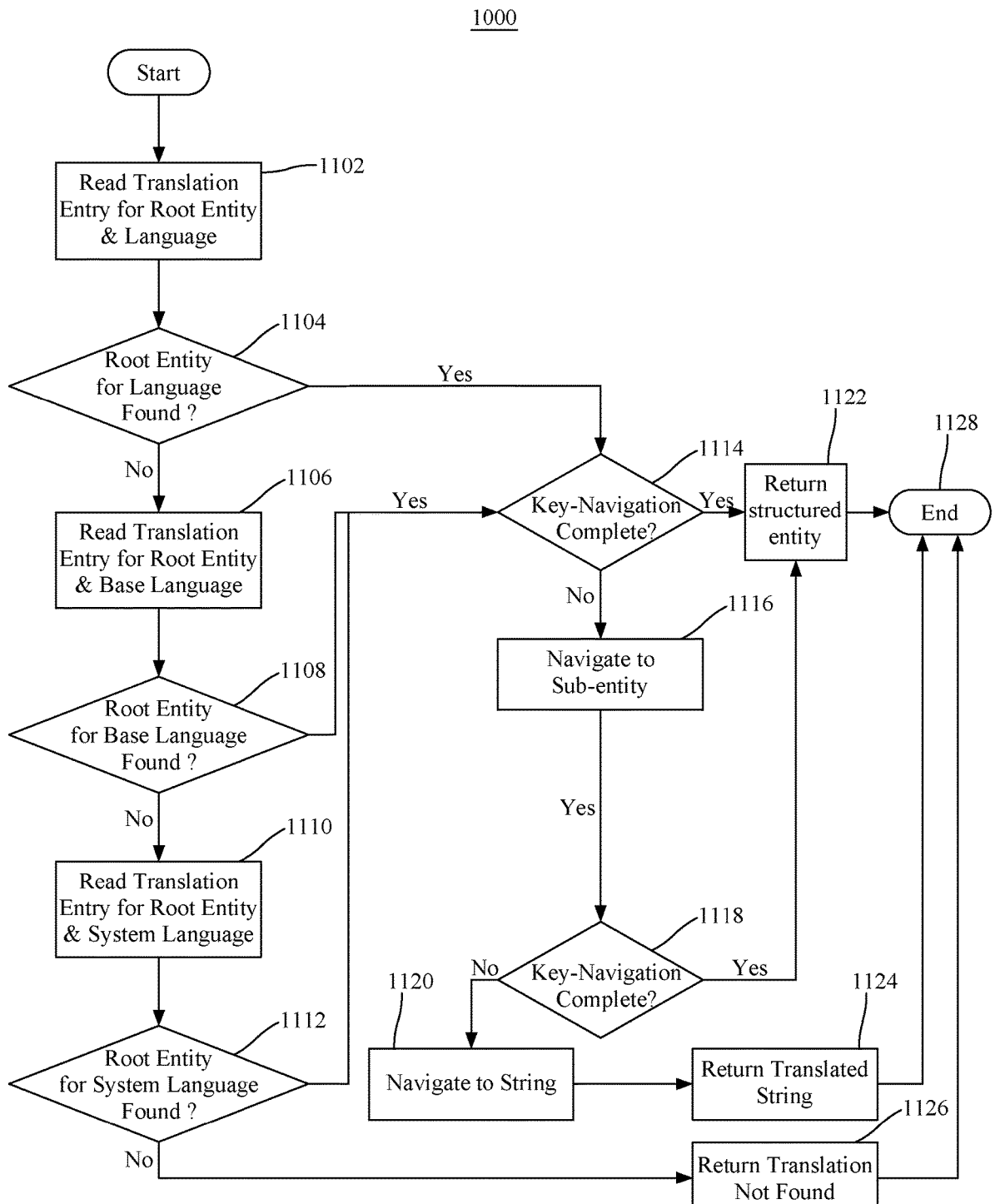
FIG. 11 shows a flowchart illustrating fallback logic according to an embodiment.

According to an embodiment, an example of a flowchart 1100 illustrating fallback logic to check for the availability of an alternative text is now described with respect to FIG. 11. Initially, in step 1102 the translation entry for Root Entity and language is attempted to be read. In step 1104, it is determined whether or not the Root Entity for language is present. If the determination in step 1104 is a no, then the translation entry for Root Entity and base language is attempted to be read in step 1106. In step 1108 it is determined whether or not the Root Entity for the base language is present. If the determination in step 1108 is a no, then the translation entry for the Root Entity and the system language is attempted to be read in step 1110. In step 1112, it is determined whether or not the Root Entity for the system language is present. If the determination in step 1112 is a no then, in step 1126, a result of translation is not found is returned to the client which results in termination of the process as shown in step 1128.

If the outcome of any of the determination steps 1104, 1108 or 1110 is a yes, then the process proceeds to step 1114 in which a determination is made as to whether or not to return the whole object to the client. At this point, beginning with step 1114, steps 1116, 1118, 1120, 1122 and 1124 replicate the steps 904, 906, 908, 910, 912 and 914, respectively, as shown in FIG. 9. As such, the description of these steps 1116, 1118, 1120, 1122 and 1124 is not repeated here.

Figure 12:
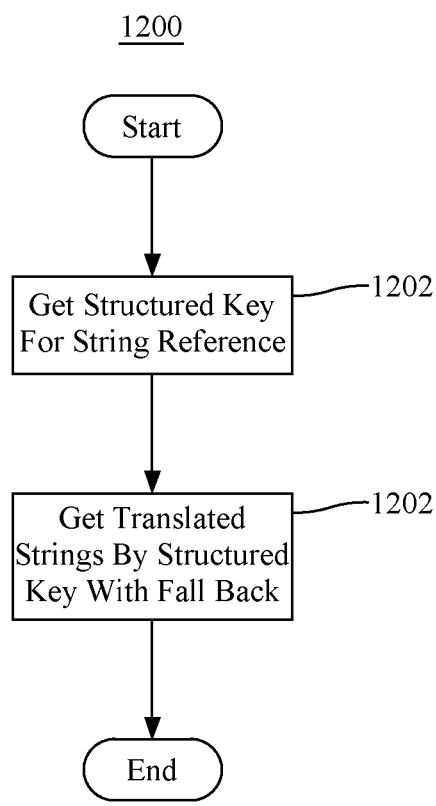
FIG. 12 depicts a flowchart of a mechanism accessing a string by its Reference identification (ID) according to an embodiment.

According to an embodiment, the mechanism to access a string by its Reference ID can support an extended log with default handling as illustrated by the flowchart 1200 shown in FIG. 12. Initially, in step 1202, a structured key for a globally unique string reference is generated or obtained. In step 1204, the structured key is used to obtain the translated string if the translated string exists, otherwise a fallback string of either the base language or the system language can be obtained if they exist.

As described above and shown in the various Figures, there exist methods and systems for generating translations for alternative texts. The following description associated with FIGS. 13-16 provides a non-limiting example for translating an entity labelled "Location" managed by a product catalog which can be accessed by a UE connected with a communication network.

Prior to describing FIGS. 13-16 in detail, some background information for the scenario is provided. In this example, there is an entity "Location", managed by a product catalog, which is used to configure personal zones with special pricing for service offerings of telecommunication providers. A subscriber of a telecommunication company can be enabled to select a personal zone as a "home zone". If a user then calls out of his home zone, using his or her UE, a special price is then applied.

The entity Location includes ID, name, description, a list of cell IDs and a sub-entity (or child entity) characteristic for a region with name. For this example, it is assumed that the system is using so-called "plain" English, thus the system language is en-UK. The "base entity" Location for the particular location "Karlskrona" appears as shown below with respect to Table 1.

TABLE 1

| Property | Value | Comment |
|---|---|---|
| id | 544321 | |
| name | Karlskrona | To be translated |
| description | Karlskrona City | To be translated |
| cellids | {240 06 455 12345, 240 06 455 12346} | |

The associated child entity for the region characteristic is shown below in Table 2.

TABLE 2

| Property | Value | Comment |
|---|---|---|
| id | 1788321 | |
| name | Region | To be translated |
| value | 0455 | |

When a product catalog application is used to create the Location entity, the product catalog application will call the centrally located translation services to instantiate a skeleton entity for en-UK, which contains the strings to be translated. The translation services will also create an entity for the back-reference. The structured key for the skeleton entity is: Location/544321/en-UK. The properties of the skeleton entity are serialized to a string which includes the following information as shown in Table 3.

TABLE 3

| Property | | |
|---|---|---|
| name | value = Karlskrona stringID = 12345 | |
| description | Value = Karlskrona City stringID = 12366 | |
| Entity characteristic | name | Value = Region stringID = 12375 |

Figure 13:
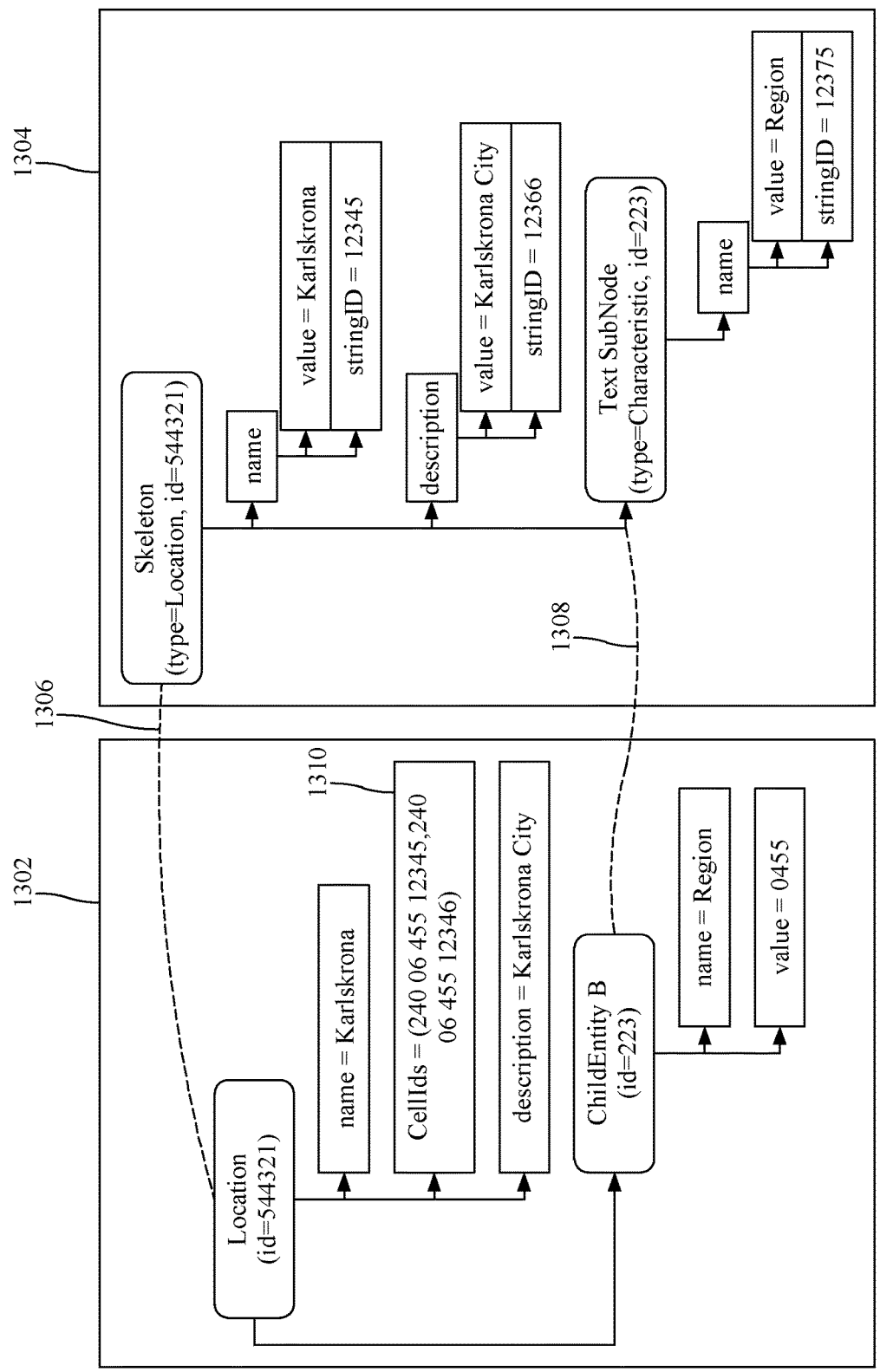
FIG. 13 illustrates an example of a base entity and its associated linked skeleton entity according to an embodiment.

Using the above provided information, an example of the base entity and its associated linked skeleton entity for the Location entity can be seen in FIG. 13. In FIG. 13 there is a base entity 1302 and a skeleton entity 1304. Similar to FIG. 1, the root nodes for the base entity 1302 and skeleton entity 1304 are on a same relative level as shown by dashed line 1306 and the sub-node (or child entity) for the base entity 1302 and the skeleton entity 1304 are also on the same relative level as shown by dashed line 1308. It can also be seen that the base entity 1302 and the skeleton entity 1304 have been populated with the information shown in Tables 1-3. Note that as the skeleton entity 1304 is used in support of translating texts, the numerical data, e.g., the cellIDs 1310 from the base entity 1302, is not imported into the skeleton entity 1304.

Continuing with this example, a back-reference object used for the lookup based on the string ID is created having the following content as shown in Table 4.

TABLE 4

| stringID | referemce |
|---|---|
| 12345 | Location/544321/Name |
| 12366 | Location/544321/Description |
| 12375 | Location/544321/Characteristic/223/Name |

Figure 14:
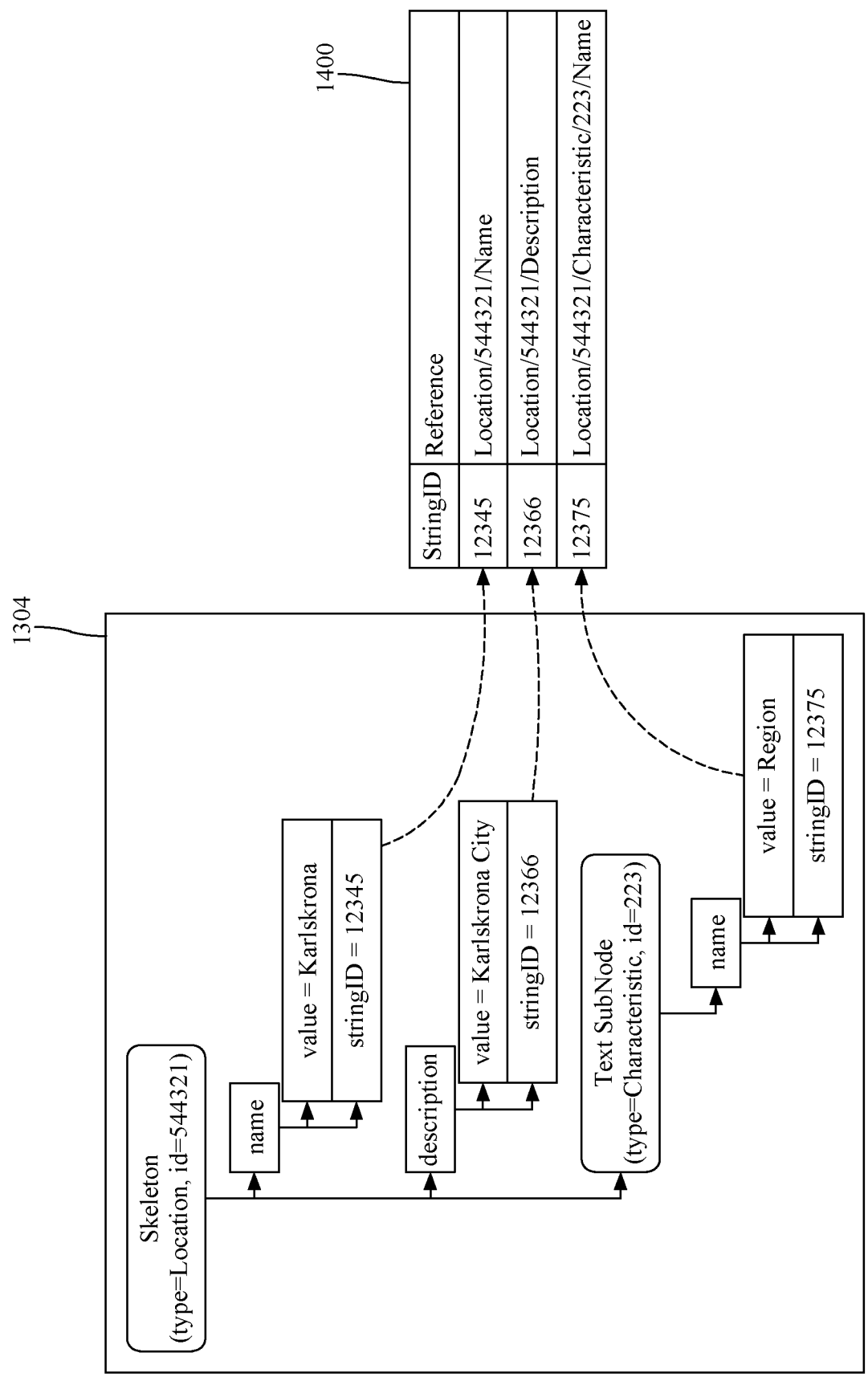
FIG. 14 shows the relationship between the skeleton entry and a back-reference lookup entry according to an embodiment.

As described above, the back-reference lookup is used for generating unique IDs for each string ID for future reference. FIG. 14 shows the relationship between the skeleton entity 1304 and the back-reference lookup entry 1400.

After generating the back-reference lookup in this example, translation using the skeleton entity 1304 can occur. Using either a translation UI or a file-based import/export mechanism, translation entities for various languages and dialects can be created. For this example, translation services are used to read the skeleton entity 1304, which is in en-UK, which is used as a template and context information for the translation entities to be created. A translation entity for Swedish (se) and German (de) are used. A key of the translation entity in Swedish is Location/544321/se and the key of the translation entity in German is Location/544321/de. The properties of both of the skeleton entities are serialized to their respective string which carries the translated string as shown below, with Table 5 being for Swedish and Table 6 being for German.

TABLE 5

| Property | | |
|---|---|---|
| name | value = Karlskrona stringID = 12345 | |
| description | Value = Karlskrona stad stringID = 12366 | |
| Entity characteristic | name | Value = region stringID = 12375 |

TABLE 6

| Property | | |
|---|---|---|
| name | value = Karlskrona stringID = 12345 | |
| description | Value = Karlskrona Stadt stringID = 12366 | |
| Entity characteristic | name | Value = Region stringID = 12375 |

Figure 15:
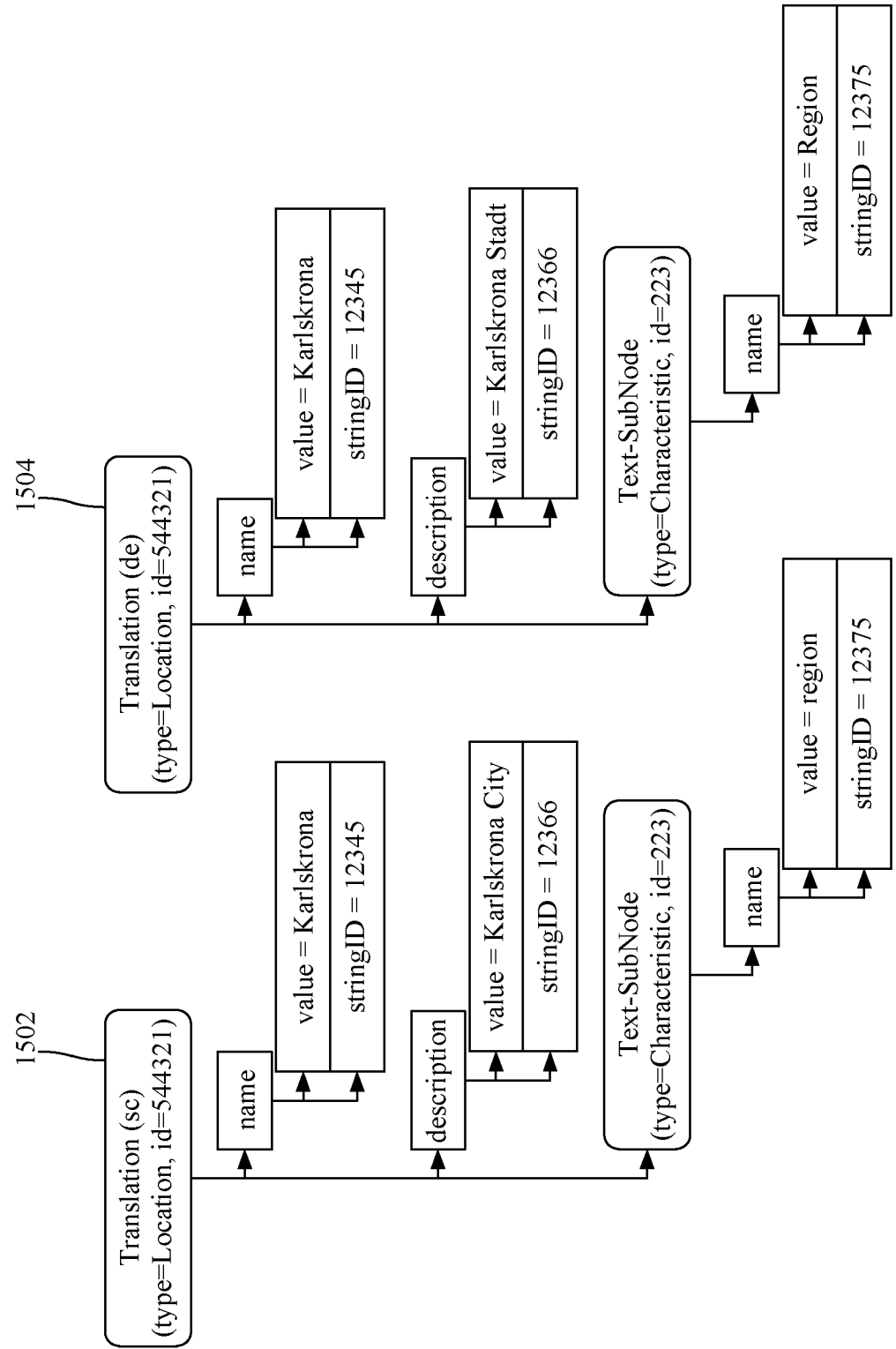
FIG. 15 shows two translation entities according to an embodiment.

Putting Tables 5 and 6 into the hierarchical form, FIG. 15 shows the two translation entities, Translation (se) entity 1502 and Translation (de) entity 1504 associated with the base entity 1302 and the skeleton entity 1304 of the Location entity. It can be seen that the base entity 1302, the skeleton entity 1304, the Translation (se) entity 1502 and the translation (de) entity 1504 are all related from each having the same "id=544321". Continuing with the example, FIG. 16 shows the translation configuration flow.

Figure 16:
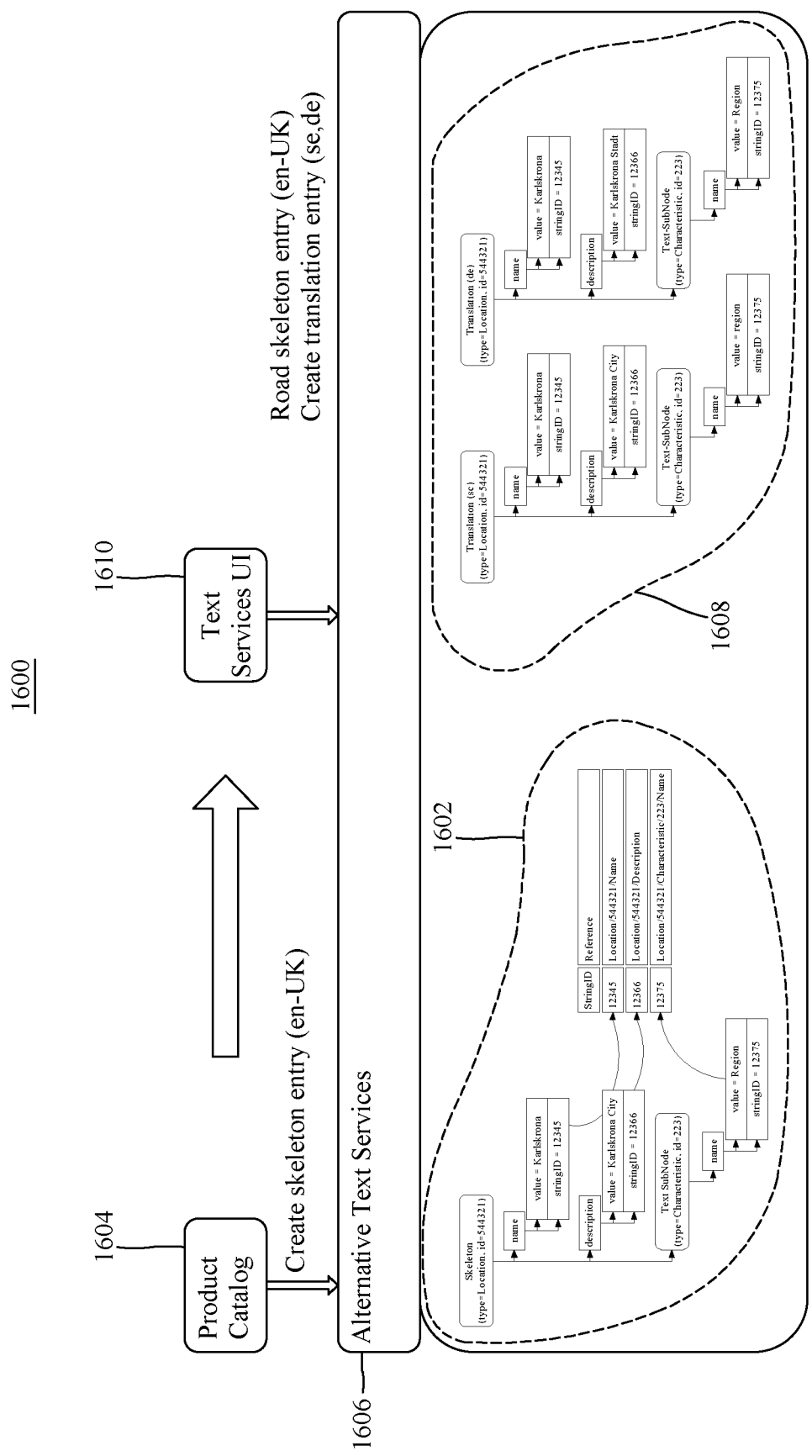
FIG. 16 illustrates another deployment view according to an embodiment.

FIG. 16 gives an overview of the creation sequence 1600. First the entity skeleton 1602 is created by the product catalog application 1604 using the alternative text services 1606. Then the translations 1608 are provided by a separate text management application 1610, which uses the alternative text services 1606 to import alternative texts or write down the translated strings directly into the translation structure.

According to an embodiment, translation services offer different access mechanisms for texts in alternative languages. All texts of an entity can be accessed by coarse grained operations. Additionally, texts for single string attributes can be addressed individually. When accessing all texts of an entity the entity key which includes entity type and ID is specified together with the intended language. If an entity translation is available in the requested language/dialect/lingo the translation entity can be returned. If no translation is available in the requested language, the fallback mechanism can be applied which attempts to find the closest match. Thus, if for example, the language/dialect combination de-CH (Swiss standard German) is requested, in the current example, the translation entry for de is returned. If the language/dialect ru (Russian) is requested, then as there is no close match available, the translation entity of the default language, which is the skeleton, will be returned.

As described above, according to an embodiment, it is possible to access a specific string property by using the unique stringID with the language/dialect/lingo. If, for example, the Swedish text for stringID=12366 is requested, the text services will access the back-reference lookup table and retrieve the hierarchical reference of the string attribute, which for the current example is Location/544321/Description. From the hierarchical reference, the key of the translation entity is extracted by using entity type and ID and appending the target language. This then results in the following structured key: Location/544321/se. The structured key to the translation entity is used to read the serialized string representation, perform a deserialization and to access the translated value of the property labelled "Description". For performance optimization, a translation entity, which has been de-serialized once, is kept in memory and used from there for subsequent requests. In case of updates on the translation, the memory is invalidated and refreshed on the next access.

Figure 17:
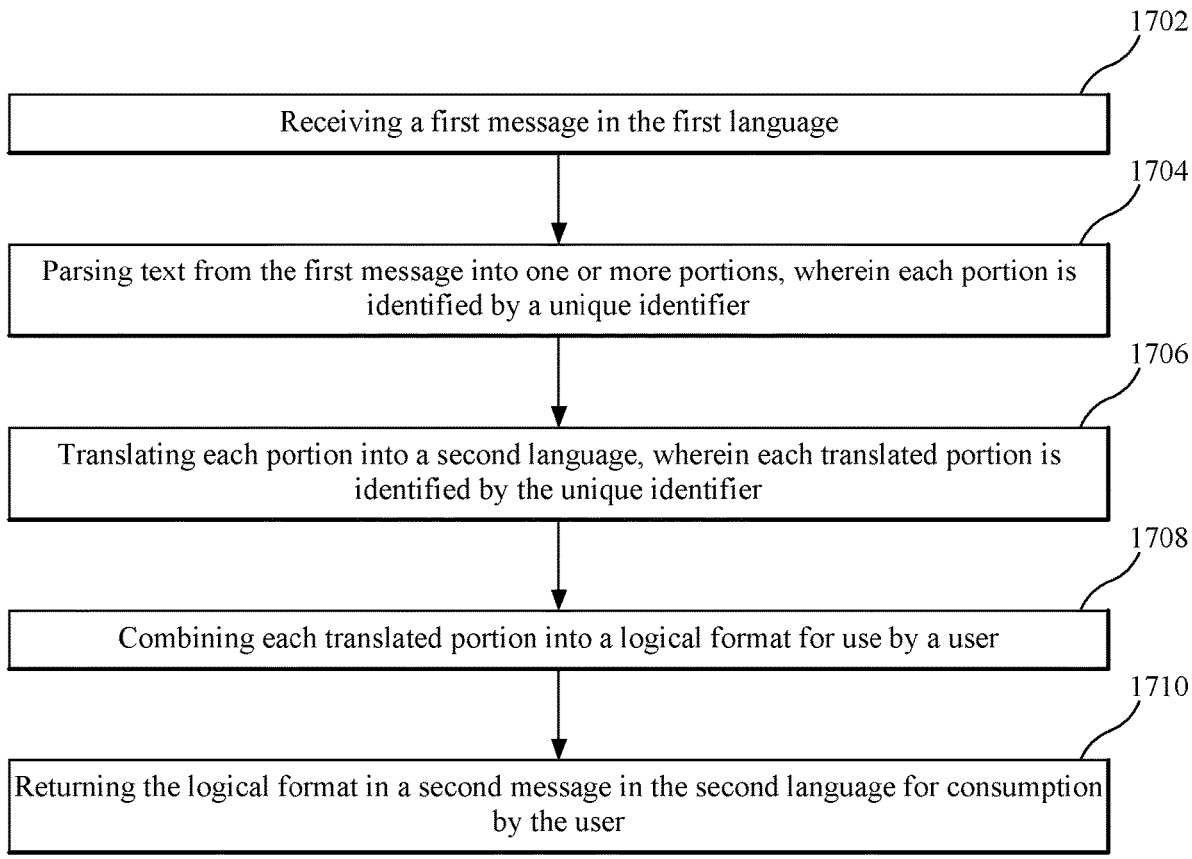
FIG. 17 shows a flowchart of a method for translating text in a first language into text in a second language according to an embodiment.

According to an embodiment there is a method for translating text in a first language into text in a second language as shown in FIG. 17. The method includes: in step 1702, receiving a first message in the first language; in step 1704, parsing text from the first message into one or more portions, wherein each portion is identified by a unique identifier; in step 1706, translating each portion into a second language, wherein each translated portion is identified by the unique identifier; in step 1708, combining each translated portion into a logical format for use by a user; and in step 1710, returning the logical format in a second message in the second language for consumption by the user.

Figure 18:
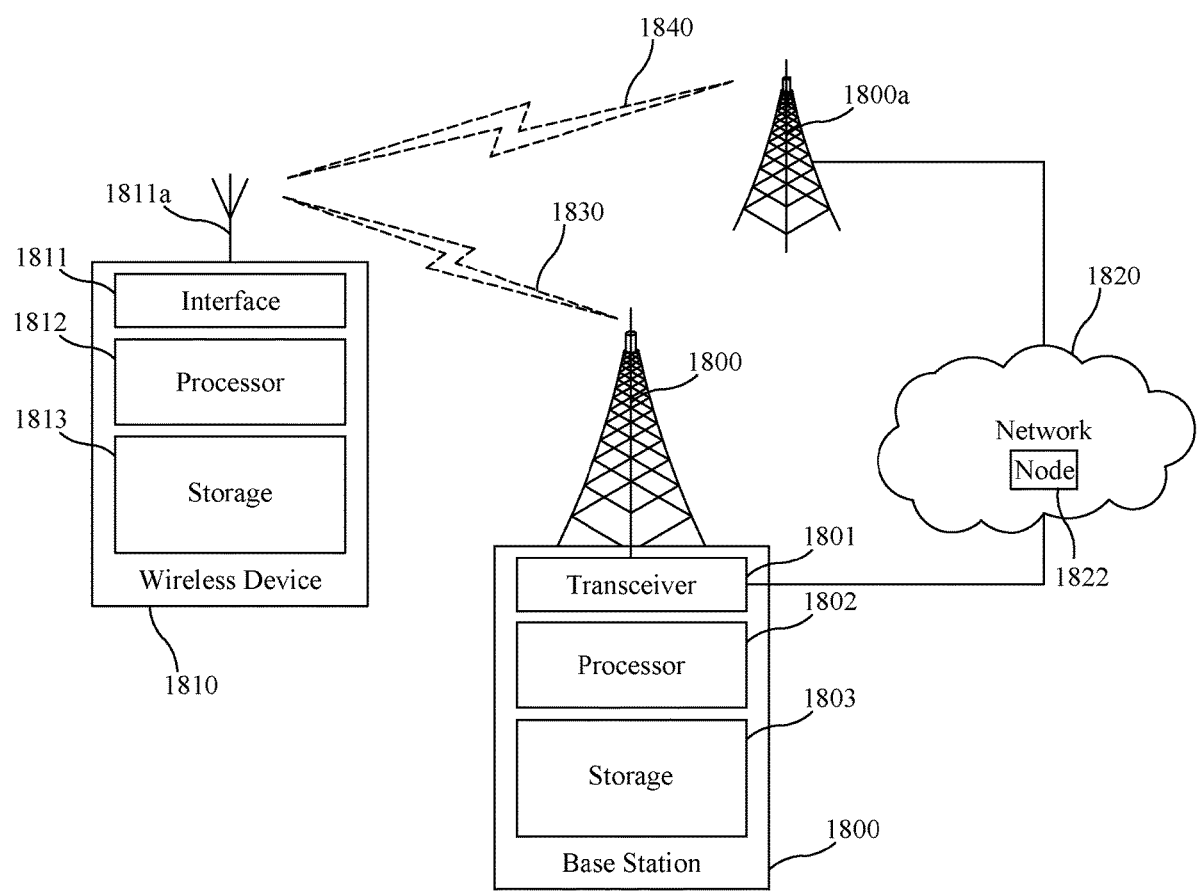
FIG. 18 depicts elements of a radiocommunication system according to an embodiment.
Figure 19:
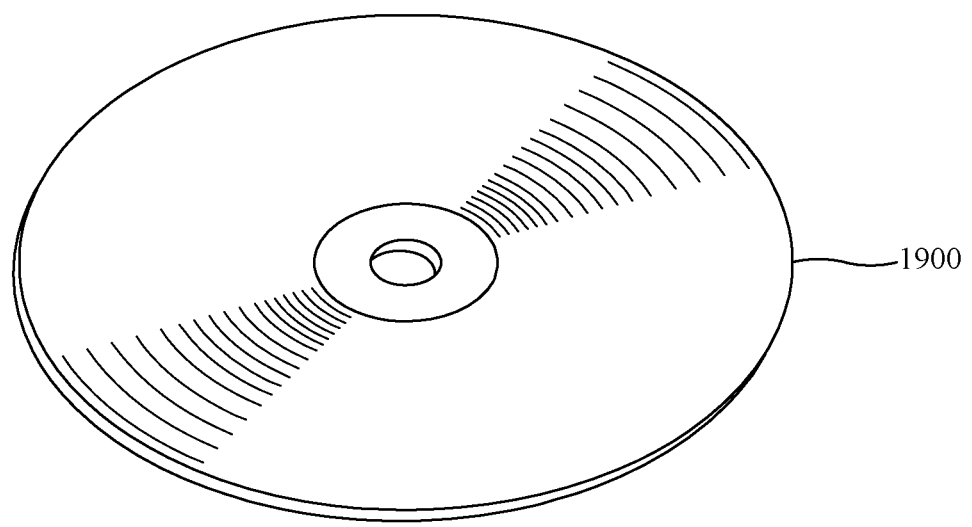
FIG. 19 depicts an electronic storage medium on which computer program embodiments can be stored.

FIG. 18 illustrates a wireless network comprising a more detailed view of network node (or base station) 1800 and wireless device (WD) 1810, in support of communicating requests and translations which can be performed at node 1820 which may be a Charging node or a Business Support Systems (BSS) node. For simplicity, FIG. 18 only depicts network 1820, network nodes 1800 and 1800a, and WD 1810, i.e., a user equipment (UE). Network node 1800 comprises processor 1802, storage 1803, interface 1801, and antenna 1801a. Similarly, WD 1810 comprises processor 1812, storage 1813, interface 1811 and antenna 1811a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 1820 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. Additionally, an OCS 302 and core network (CN) 306 are shown.

Network node 1800 comprises processor 1802, storage 1803, interface 1801, and antenna 1801a. These components are depicted as single boxes located within a single larger box. In practice however, a network node may comprise multiple different physical components that make up a single illustrated component (e.g., interface 1801 may comprise terminals for coupling wires for a wired connection and a radio transceiver for a wireless connection). As another example, network node 1800 may be a virtual network node in which multiple different physically separate components interact to provide the functionality of network node 1800 (e.g., processor 1802 may comprise three separate processors located in three separate enclosures, where each processor is responsible for a different function for a particular instance of network node 1800). Similarly, network node 1800 may be composed of multiple physically separate components (e.g., a NodeB component or gNB component and a RNC component, a BTS component and a BSC component, etc.), which may each have their own respective processor, storage, and interface components. In certain scenarios in which network node 1800 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 1800 may be configured to support multiple radio access technologies (RATs). In such embodiments, some components may be duplicated (e.g., separate storage 1803 for the different RATs) and some components may be reused (e.g., the same antenna 1801 may be shared by the RATs).

Processor 1802 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1800 components, such as storage 1803, network node 1800 functionality. For example, processor 1802 may execute instructions stored in storage 1803.

Storage 1803 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1803 may store any suitable instructions, data or information, including software and encoded logic, utilized by network node 1800. Storage 1803 may be used to store any calculations made by processor 1802 and/or any data received via interface 1801.

Network node 1800 also comprises interface 1801 which may be used in the wired or wireless communication of signaling and/or data between network node 1800, network 1820, and/or WD 1810. For example, interface 1801 may perform any formatting, coding, or translating that may be needed to allow network node 1800 to send and receive data from network 1820 over a wired connection. Interface 1801 may also include a radio transmitter and/or receiver that may be coupled to or a part of antenna 1801a. The radio may receive digital data that is to be sent out to other network nodes or WDs via a wireless connection. The radio may convert the digital data into a radio signal having the appropriate channel and bandwidth parameters. The radio signal may then be transmitted via antenna 1801a to the appropriate recipient (e.g., WD 1810).

Antenna 1801a may be any type of antenna capable of transmitting and receiving data and/or signals wirelessly. In some embodiments, antenna 1801a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 1810 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 1800 and/or other WDs via uplink signals or sidelink signals, respectively. WD 1810 comprises processor 1812, storage 1813, interface 1811, and antenna 1811a. Like network node 1800, the components of WD 1810 are depicted as single boxes located within a single larger box, however in practice a wireless device may comprises multiple different physical components that make up a single illustrated component (e.g., storage 1813 may comprise multiple discrete microchips, each microchip representing a portion of the total storage capacity).

Processor 1812 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 1810 components, such as storage 1813, WD 1810 functionality. Such functionality may include providing various wireless features discussed herein, including any of the features or benefits disclosed herein.

Storage 1813 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 1813 may store any suitable data, instructions, or information, including software and encoded logic, utilized by WD 1810. Storage 1813 may be used to store any calculations made by processor 1812 and/or any data received via interface 1811.

Interface 1811 may be used in the wireless communication of signalling and/or data between WD 1810 and network node 1800. For example, interface 1811 may perform any formatting, coding, or translating that may be needed to allow WD 1810 to send and receive data from network node 1800 over a wireless connection. Interface 1811 may also include a radio transmitter and/or receiver that may be coupled to or a part of antenna 1811*a*. The radio may receive digital data that is to be sent out to network node 1801 via a wireless connection. The radio may convert the digital data into a radio signal having the appropriate channel and bandwidth parameters. The radio signal may then be transmitted via antenna 1811*a* to network node 1800.

Antenna 1811*a* may be any type of antenna capable of transmitting and receiving data and/or signals wirelessly. In some embodiments, antenna 1811*a* may comprise one or more omni-directional, sector or panel antennas operable to transmit/receive radio signals between 2 GHz and 66 GHz. For simplicity, antenna 1811*a* may be considered a part of interface 1811 to the extent that a wireless signal is being used.

The non-limiting term UE refers to any type of wireless device communicating with a network node in a cellular or mobile communication system over radio interface. Examples of UEs are target devices, device to device (D2D) UEs, proximity-based service (ProSe) UEs, machine type UEs or UEs capable of machine to machine communication (aka category 0 UEs, low cost and/or low complexity UEs), PDAs, iPADs, tablets, mobile terminals, smart phones, laptop embedded equipment (LEE), laptop mounted equipment (LME), USB dongles, wireless devices etc. An example of a UE 1810 is illustrated in FIG. 18 including a processor 1802, radio transceiver 1804, and antenna 1806.

Various embodiments described herein refer in some fashion to nodes, e.g., the communication node which performs the centralized translation function 1820 which as described above can be associated with Charging and/or other BSS functions. In some embodiments the non-limiting network node (also interchangeably called as node) is more commonly used and it refers to any type of network node which directly or indirectly communicates with the UE. It can be a radio network node or a node in a core network or fixed part of the network such as the node 1820. For example, it can be a network node serving the UE, a network node neighboring to the serving network node of the UE, any network node in the radio network or in the core network in wireless communication system in which UE operates. Examples of network nodes are base stations (BS), multi-standard radio (MSR) radio nodes such as MSR BS, eNode B (eNB), network controllers, radio network controllers, base station controllers, relay, donor node controlling relays, base transceiver stations (BTS), access points (AP), core network nodes (e.g. MSC, MME etc), O&M, OSS, SON, location server (e.g. E-SMLC), MDT etc. It is to be understood that network node 1820 includes functional pieces similar to those shown for base station 1800.

The embodiments described herein can be used in customer relationship management (CRM) applications or other frontend applications such as applications which have to present data with alternative texts in multiple languages. Embodiments describe various mechanisms which provide a common approach to configure "plain" translation for texts in different languages and dialects as well as alternative texts for different contexts, e.g., channels and specific target audiences. Embodiments using a common and centralized mechanism can add multi-language support for content which do not currently have this support. Additionally, embodiments can provide multiple language support in a diversified environment in the cloud combining applications which foresee desiring multiple language support with applications which do not for see this need. Also, embodiments provide for optimized storage and access for alternative texts on data entities.

As described above, embodiments provide the ability to capture and retrieve alternative texts in multiple languages for string properties of any type of object, be it business objects, e.g., entities of a product catalog, or system objects, e.g., error messages, or frontend user interface (UI) objects. Embodiments combine two different techniques of addressing strings which are externalized from the owning entities for translation. The two different techniques are as follows: (1) using a structured addressing exposing all strings belonging to an object; and (2) using a unique identifier for the string.

The embodiments described herein are agnostic with respect to specific object or data structures and provide a general way of externalizing strings in multiple languages or locales into an entity structure which is optimized for read performance and thus compatible for storage in a non-SQL database. Additionally, embodiments are generic in the sense that string properties for any type of objects having different potentially hierarchical structures are referenced by a logical addressing describing the structural nodes, and thus can be managed in a central place without losing context from where the translation originates.

According to an embodiment, alternative texts can be configured for logical languages. As used herein, a logical language is a string, which is built according to one of the following options: the Java™ locale, the two digit base language code from the Java locale; or a flexible non-standardized combination of a two digit language abbreviation and an additional string to indicate the dialect, country or lingo according to the following regular expression: ([a-z][a-z]\-(\w){1,255})[a-z][a-z]. The regular expression allows either a 2-digit language abbreviation ([a-z][a-z]) or the language abbreviation extended with a dialect string separated by "-" ([a-z][a-z]\-(\w){1,255}). Using regular expressions is one possible way to ensure using the correct language format in case the language is specified with a dialect. The format check on the language string is used to be able to easily define language groups which allow for a fallback strategy in case a certain translation or alternative text does not exist. It is too be understood that the above shown regular expression is only a non-limiting example and that other algorithms can be used.

Some examples of a language configuration are as follows: en (English default), en-US (English US dialect), en-UK (English UK dialect), en-APP1 (a special dialect for APP1, e.g., only ASCII7 characters as only those are supported in APP1), en-SMS (special sorts texts and abbreviations in English and, en-KIDS (kids language and salutations in English). Each of these languages are intended for a certain audience. In the simplest scenario, where a human who is able to interpret and understand English, the language configuration "en" would be used. It can even be so, that the language configuration is even more specific, by defining a certain type of dialect, in this case en-US can be used where en is referring to the English language and US the American country. If the intended audience is kids that speak English, language configuration would be en-KIDS. It might even be so that the intended audience is using a cellphone to receive a message, were the maximum length of the text message is 160 characters, the language configuration en-SMS could be used As long as there is an understanding of the format of the "language" to all client applications using the alternative text services, context sensitive texts for objects can be supported. The language can also be used to translate into technical languages for human to machine or machine to machine communications when, for example, the language can be turned into something logical and/or executable than just a text that has the goal of being interpreted by a human being. Thus, according to an embodiment, the alternative text mechanism can even be used as a converter between two applications which do not communicate in the same language.

According to an embodiment, an overall system language can be configured which can be used to support a fallback mechanism in case of missing translations. The system language can also be used for translation workflows to serve as a source string which is then provided in other target languages to be supported. The alternative text services can support an optional fallback mechanism between translations. This default handling ensures that a reasonable text is returned if a certain text is missing for a certain language.

According to an embodiment, there can be a fallback mechanism. For example, if an alternative text entry for a root entity does not exist, the system can search for an entry in the base language instead. If this entry in the base language is also not found, then the system can search for an entry in the system language, provided the system language is configured.

According to an embodiment, the alternative text service manages all languages in the same manner. There are typically no differences made between entries for a potential system language, entries for a base language or entries for a fully qualified logical language string. All entries have the same structure and contain the alternative texts in the respective language for the string properties in question. This allows for any of the languages to potentially be used in the role of the system language and for that instance no further migration is needed. The system language can be configured or switched at any point in time due to the peer structure of entries for all languages It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments, e.g., the associated with translation into alternative texts, to include embodiments described herein, such as, the method associated with FIG. 17, may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for translating text in a first language into text in a second language, the method comprising:
receiving a first message in the first language;
parsing text from the first message into one or more portions, wherein each portion is identified by a unique identifier;
translating each portion into the second language, wherein each translated portion is identified by the unique identifier;
combining each translated portion into a logical format for use by a user; and
returning the logical format in a second message in the second language for consumption by the user,
wherein the one or more portions are generated within an entity skeleton which includes an entity type for each portion, wherein the translating is using a translation entity having the same structure as the entity skeleton with a difference being translated content, wherein the entity skeleton and the translation entity each include the unique identifier, wherein a serialization algorithm is applied to create a translation entry for the entity skeleton, and wherein the translation entity includes a key and a binary data blob.

2. The method of claim 1, wherein the first language is chosen based on a current location of the user as determined by a location of a user equipment (UE) associated with the user.

3. The method of claim 1, wherein the second language is chosen based on one of an outside factor, a selection by the user, and a home location of the user.

4. The method of claim 1, wherein each portion is a translatable word or phrase.

5. The method of claim 1, wherein the text in the first language is translated into several languages.

6. The method of claim 1, wherein the text from the first message is associated with an application.

7. The method of claim 1, wherein translating each portion into the second language is performed by one of a direct write operation to a text entity or by a file-base import and export mechanism using a common file format.

8. The method of claim 1, wherein text in the second message in the second language is displayed on a screen of a user equipment (UE).

9. A computer program stored on a non-transitory computer-readable medium comprising instructions which, when executed on at least one processor, cause the at least one processor to carry out the method according to claim 1.

10. The method of claim 1, wherein the method is performed in a telecommunications network and further comprising:
receiving a request to translate the first message in the first language into a second message in the second language, wherein when the second language is not available, a third language which is closest match to the second language is used to translate the second message into the third language instead of the second language.

11. The method of claim 1, comprising at least two translation entities each including the same unique identifier as the entity skeleton.

12. The method of claim 1, wherein the second language is a specific dialect.

13. A communication node for translating text in a first language into text in a second language, the communication node comprising:
a communication interface configured to receive a first message in the first language;
a processor configured to parse text from the first message into one or more portions, wherein each portion is identified by a unique identifier;
the processor being further configured to translate each portion into the second language, wherein each translated portion is identified by the unique identifier;
the processor being further configured to combine each translated portion into a logical format for use by a user; and
the communication interface being further configured to return the logical format in a second message in the second language for consumption by the user,
wherein the one or more portions are generated within an entity skeleton which includes an entity type for each portion, wherein the translating is using a translation entity having the same structure as the entity skeleton with a difference being translated content, wherein the entity skeleton and the translation entity each include the unique identifier, wherein a serialization algorithm is applied to create a translation entry for the entity skeleton, and wherein the translation entity includes a key and a binary data blob.

14. The communication node of claim 13, wherein the first language is chosen based on a current location of the user as determined by a location of a user equipment (UE) associated with the user.

15. The communication node of claim 13, wherein the second language is chosen based on one of an outside factor, a selection by the user, and a home location of the user.

16. The communication node of claim 13, wherein each portion is a translatable word or phrase.

17. The communication node of claim 13, wherein the text in the first language is translated into several languages.

18. The communication node of claim 13, wherein the text from the first message is associated with an application.

19. The communication node of claim 13, wherein translating each portion into the second language is performed by one of a direct write operation to a text entity or by a file-base import and export mechanism using a common file format.

20. The communication node of claim 13, wherein text in the second message in the second language is displayed on a screen of a user equipment (UE).

21. A non-transitory computer-readable storage medium containing a computer-readable code that when read by a processor causes the processor to perform a method for translating text in a first language into text in a second language, the method comprising:
receiving a first message in the first language,
parsing text from the first message into one or more portions, wherein each portion is identified by a unique identifier;
translating each portion into the second language, wherein each translated portion is identified by the unique identifier;
combining each translated portion into a logical format for use by a user; and
returning the logical format in a second message in the second language for consumption by the user,
wherein the one or more portions are generated within an entity skeleton which includes an entity type for each portion, wherein the translating is using a translation entity having the same structure as the entity skeleton with a difference being translated content, wherein the entity skeleton and the translation entity each include the unique identifier, wherein a serialization algorithm is applied to create a translation entry for the entity skeleton, and wherein the translation entity includes a key and a binary data blob.

22. An apparatus comprising:
a processor, wherein the processor is configured perform the steps of:
receiving a first message in a first language;
parsing text from the first message into one or more portions, wherein each portion is identified by a unique identifier;
translating each portion into a second language, wherein each translated portion is identified by the unique identifier;
combining each translated portion into a logical format for use by a user; and
returning the logical format in a second message in the second language for consumption by the user,
wherein the one or more portions are generated within an entity skeleton which includes an entity type for each portion, wherein the translating is using a translation entity having the same structure as the entity skeleton with a difference being translated content, wherein the entity skeleton and the translation entity each include the unique identifier, wherein a serialization algorithm is applied to create a translation entry for the entity skeleton, and wherein the translation entity includes a key and a binary data blob.

23. An apparatus, comprising:
a first circuitry configured to receive a first message in a first language,
a second circuitry configured to parse text from the first message into one or more portions, wherein each portion is identified by a unique identifier;

a third circuitry configured to translate each portion into a second language, wherein each translated portion is identified by the unique identifier;
a fourth circuitry configured to combine each translated portion into a logical format for use by a user; and
a fifth circuitry configured to return the logical format in a second message in the second language for consumption by the user,
wherein the one or more portions are generated within an entity skeleton which includes an entity type for each portion, wherein the translating is using a translation entity having the same structure as the entity skeleton with a difference being translated content, wherein the entity skeleton and the translation entity each include the unique identifier, wherein a serialization algorithm is applied to create a translation entry for the entity skeleton, and wherein the translation entity includes a key and a binary data blob.

* * * * *